United States Patent
Lim et al.

(10) Patent No.: US 12,242,736 B1
(45) Date of Patent: Mar. 4, 2025

(54) MEMORY CONTROLLER INCLUDING ROW HAMMER TRACKING DEVICE

(71) Applicant: SK hynix Inc., Gyeonggi-do (KR)

(72) Inventors: Jae Il Lim, Gyeonggi-do (KR); Jae Won Chung, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 18/404,891

(22) Filed: Jan. 5, 2024

(30) Foreign Application Priority Data

Sep. 1, 2023 (KR) .................. 10-2023-0116201

(51) Int. Cl.
*G06F 3/06* (2006.01)
(52) U.S. Cl.
CPC .......... *G06F 3/0619* (2013.01); *G06F 3/0659* (2013.01); *G06F 3/0673* (2013.01)
(58) Field of Classification Search
CPC .............................. G06F 3/0619; G06F 3/0659
See application file for complete search history.

(56) References Cited

U.S. PATENT DOCUMENTS

| | | | |
|---|---|---|---|
| 11,568,917 B1 | 1/2023 | Shin et al. | |
| 2022/0121398 A1* | 4/2022 | Nale | G06F 3/0659 |
| 2022/0199144 A1 | 6/2022 | Roberts | |
| 2023/0260565 A1* | 8/2023 | Gieske | G11C 11/40622 365/185.04 |
| 2023/0376241 A1* | 11/2023 | Wang | G06F 3/0659 |
| 2023/0385206 A1* | 11/2023 | Agarwal | G11C 11/40603 |
| 2024/0062800 A1* | 2/2024 | Van Der Veen | G06F 13/1636 |
| 2024/0071459 A1* | 2/2024 | Confalonieri | G06F 3/0683 |
| 2024/0134982 A1* | 4/2024 | Vergis | G06F 21/554 |

OTHER PUBLICATIONS

Yeonhong Park et al., Graphene: Strong yet Lightweight Row Hammer Protection, 2020 53rd Annual IEEE/ACM International Symposium on Microarchitecture (MICRO), 2020, pp. 1-13.
Moinuddin Qureshi et al., Hydra: Enabling Low-Overhead Mitigation of Row-Hammer at Ultra-Low Thresholds via Hybrid Tracking, ISCA '22, Jun. 18-22, 2022, pp. 699-710, New York City, NY.
Yicheng Wang et al., Detect DRAM Disturbance Error by Using Disturbance Bin Counters, IEEE Computer Architecture Letters, Jan.-Jun. 2019, pp. 34-37, vol. 18, No. 1.

* cited by examiner

*Primary Examiner* — Jason W Blust
(74) *Attorney, Agent, or Firm* — IP & T GROUP LLP

(57) ABSTRACT

A memory controller includes a command/address generation module; and a row-hammer tracking module configured to track a row-hammer address based on an active command and an address for a target bank and a target row indicated by the active command, the active command and the address being received from the command/address generation module, wherein the row-hammer tracking module includes: a plurality of storage devices each including fields corresponding to banks, each of the fields storing candidate addresses and access counting values for the candidate addresses; and at least one search controller configured to sequentially search, according to a clock, fields of the plurality of storage devices corresponding to the target bank when the active command is input, and search, during one clock, fields of the plurality of storage devices corresponding to different banks based on active commands indicating the different banks.

21 Claims, 36 Drawing Sheets

| BK0 | 1 |
|-----|---|
| BK1 | 4 |
| BK2 | 3 |
| BK3 | 6 |

FIG. 11B
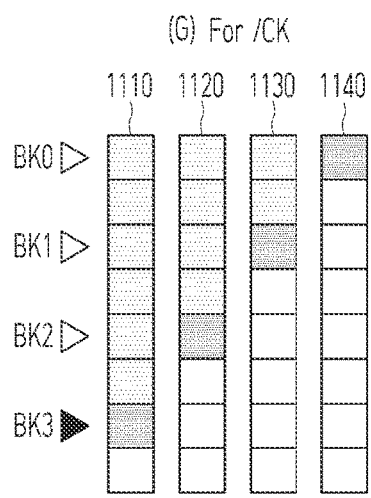
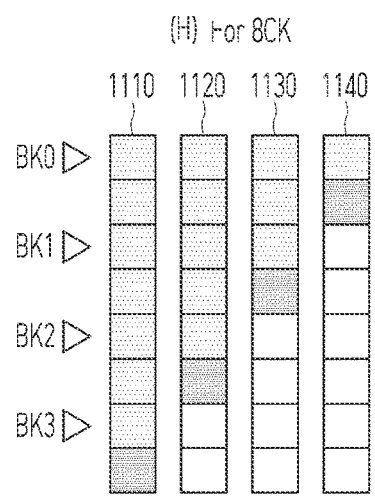
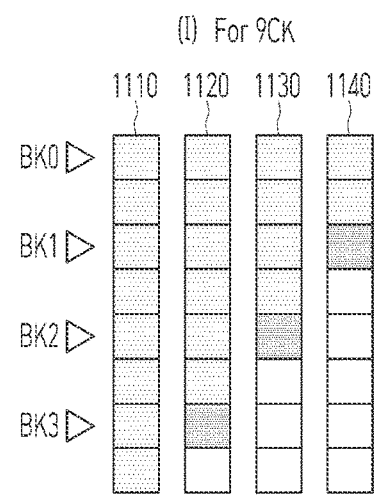
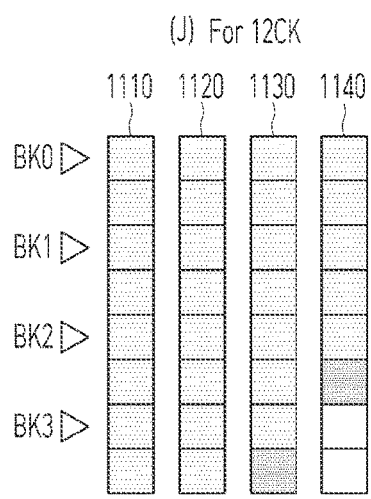
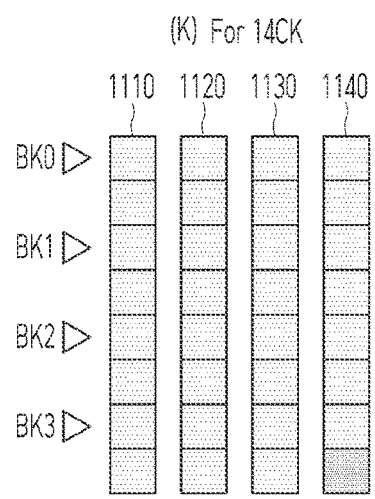

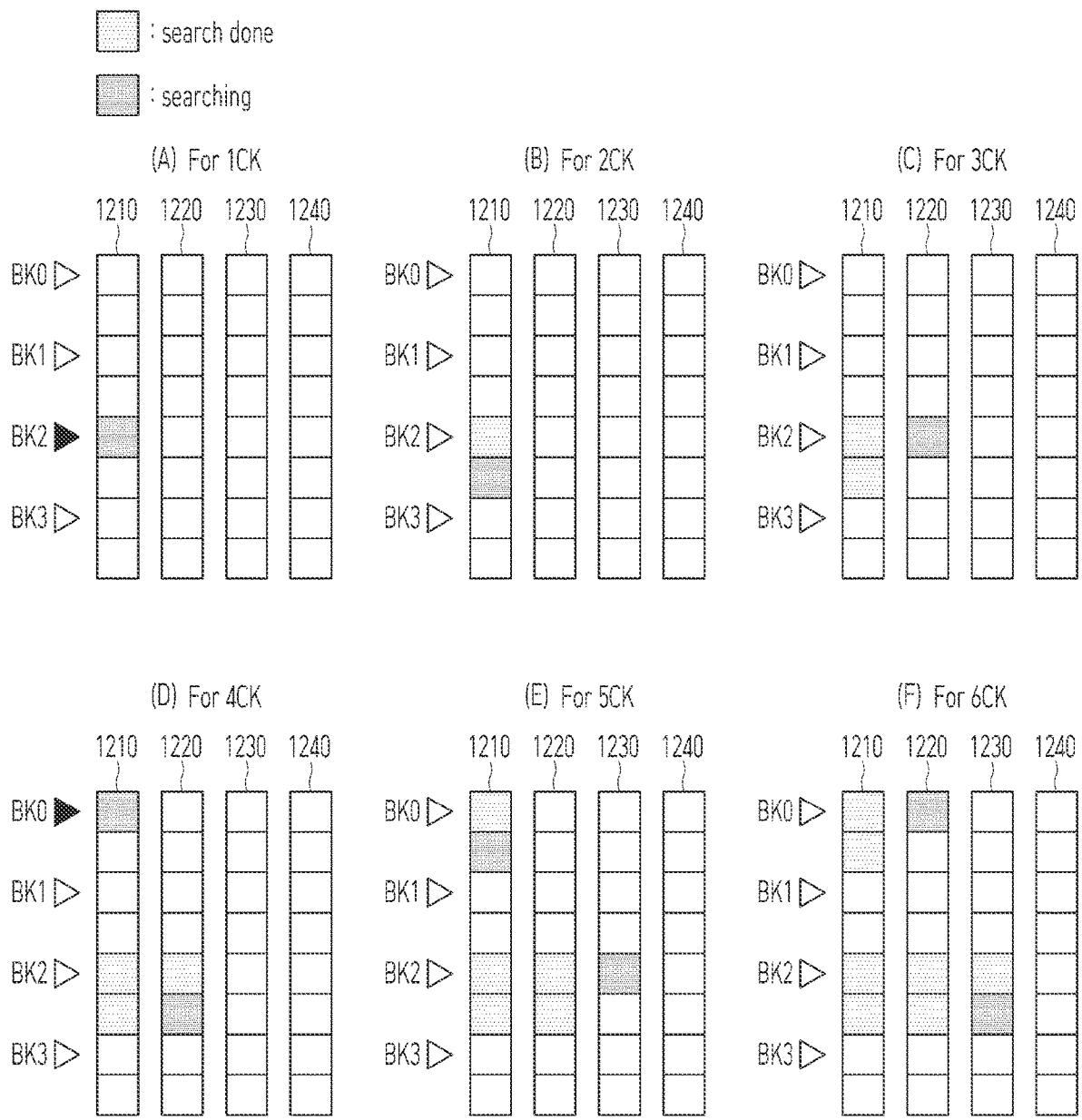

FIG. 12C
 : search done
 : searching
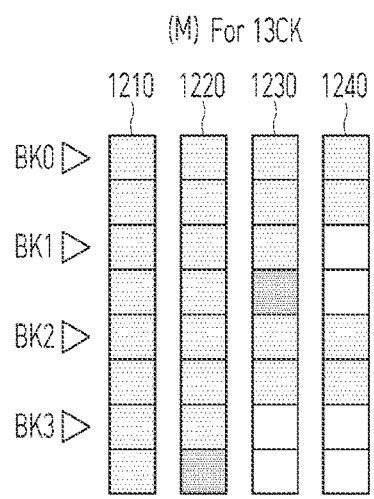
(M) For 13CK
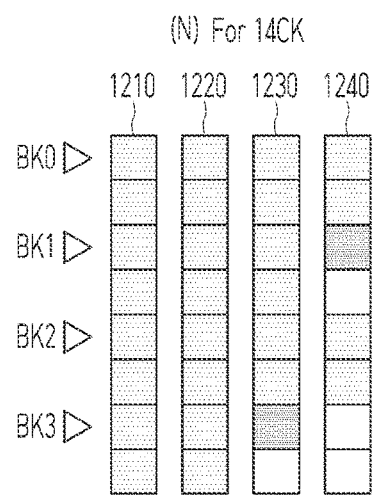
(N) For 14CK
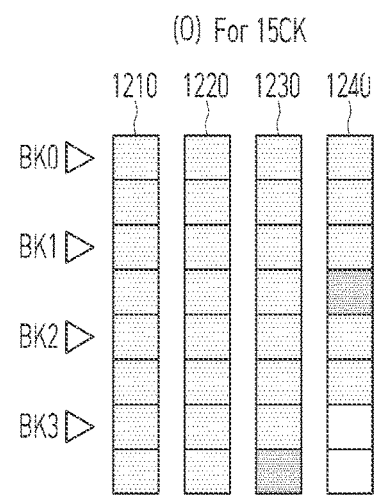
(O) For 15CK
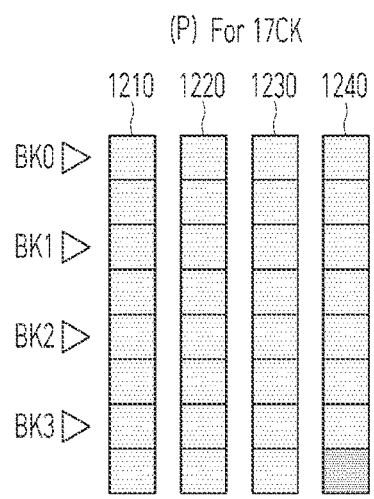
(P) For 17CK

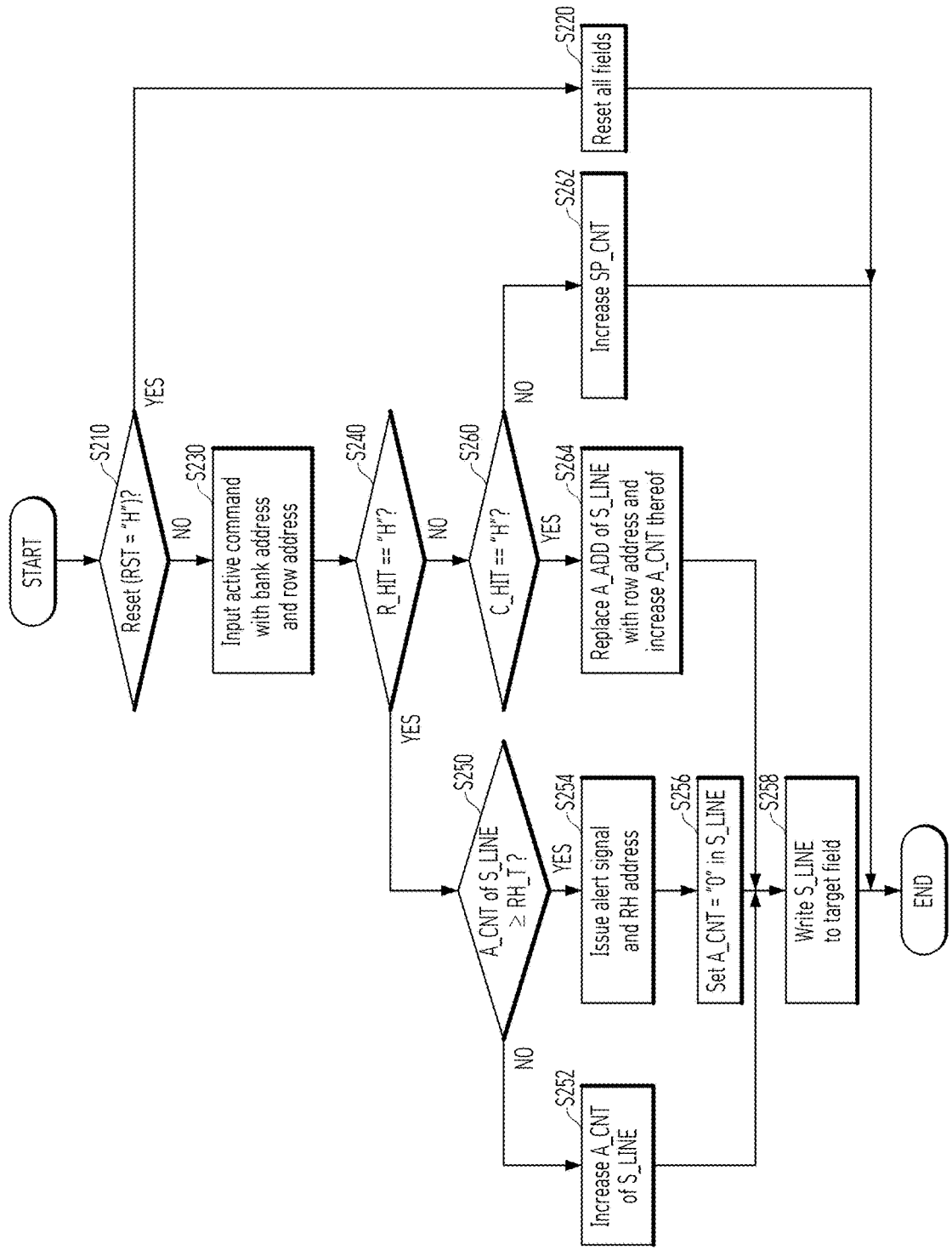

MEMORY CONTROLLER INCLUDING ROW HAMMER TRACKING DEVICE

CROSS-REFERENCE TO RELATED APPLICATIONS

The present application claims the benefit of Korean Patent Application No. 10-2023-0116201, filed on Sep. 1, 2023, which is incorporated herein by reference in its entirety.

BACKGROUND

1. Field

Various embodiments of the present disclosure relate to a semiconductor design technology, and more particularly, to a memory system and a memory controller including a row-hammer tracking device.

2. Description of the Related Art

Recently, in memory systems, in addition to a normal refresh operation, an additional refresh operation may be performed. The normal refresh operation may be an operation for sequentially refreshing a plurality of word lines. The additional refresh operation may be performed on a specific word line that is likely to lose data due to row hammering, which will be hereinafter referred to as a 'target refresh operation'. The row hammering phenomenon refers to a phenomenon in which data of memory cells coupled to a specific word line or neighboring word lines disposed adjacent to the specific word line are damaged due to a high number of activations of the specific word line. To prevent the row hammering phenomenon, a target refresh operation is performed on word lines disposed adjacent to a word line that is activated more than a predetermined number of times which is, hereinafter, referred to as a 'target word line'.

During a target refresh operation, to detect an attack word line and select an address to be refreshed (hereinafter referred to as a "row-hammer address"), a memory device or memory controller needs to detect word lines that are activated more than a preset number of times. Recently, various methods for detecting a row-hammer address by tracking a row address input with an active command have been studied.

SUMMARY

Embodiments of the present disclosure are directed to a memory controller including a row-hammer tracking device capable of efficiently detecting a row-hammer address.

According to an embodiment of the present disclosure, a memory controller includes a command/address generation module; and a row-hammer tracking module configured to track a row-hammer address based on an active command and an address for a target bank and a target row indicated by the active command, the active command and the address being received from the command/address generation module, wherein the row-hammer tracking module includes: a plurality of storage devices each including fields corresponding to banks, each of the fields storing candidate addresses and access counting values for the candidate addresses; and at least one search controller configured to sequentially search, according to a clock, fields of the plurality of storage devices corresponding to the target bank when the active command is input, and search, during one clock, fields of the plurality of storage devices corresponding to different banks based on active commands indicating the different banks.

According to an embodiment of the present disclosure, a row-hammer tracking device includes a spillover counter configured to store a miss-counting value; a plurality of storage devices each including fields corresponding to banks, each of the fields storing candidate addresses and access counting values for the candidate addresses; a plurality of search controllers cascaded to each other and corresponding to the plurality of storage devices, configured to generate an address hit signal, a count hit signal, and field information by comparing candidate addresses and access counting values read from fields corresponding to a bank address, with a row address and the miss-counting value, respectively; and an update controller configured to update the miss-counting value or an access counting value of a target field designated by the field information, according to the address hit signal and the count hit signal.

According to embodiments of the present disclosure, the memory system may minimize the area occupied by the row-hammer tracking device by implementing a row-hammer tracking device using a static random access memory (SRAM) as a storage device instead of a previously known content addressable memory (CAM). In addition, the memory system may detect row-hammer addresses in a short time by reading data from storage devices in a pipeline manner, thereby efficiently mitigating the row-hammer risk.

BRIEF DESCRIPTION OF THE DRAWINGS

FIG. 5 is a detailed configuration diagram illustrating a spillover counter of FIG. 4.

FIGS. 8A to 8C describe a read operation of the storage device group of FIG. 7.

FIGS. 9A to 9D describe another read operation of the storage device group of FIG. 7.

FIGS. 11A and 11B describe a read operation of the storage device group of FIG. 10.

FIGS. 12A to 12C describe another read operation of the storage device group of FIG. 10.

FIG. 14 is a flowchart for describing an operation of an update controller according to an embodiment of the present disclosure.

DETAILED DESCRIPTION

Figure 1A:
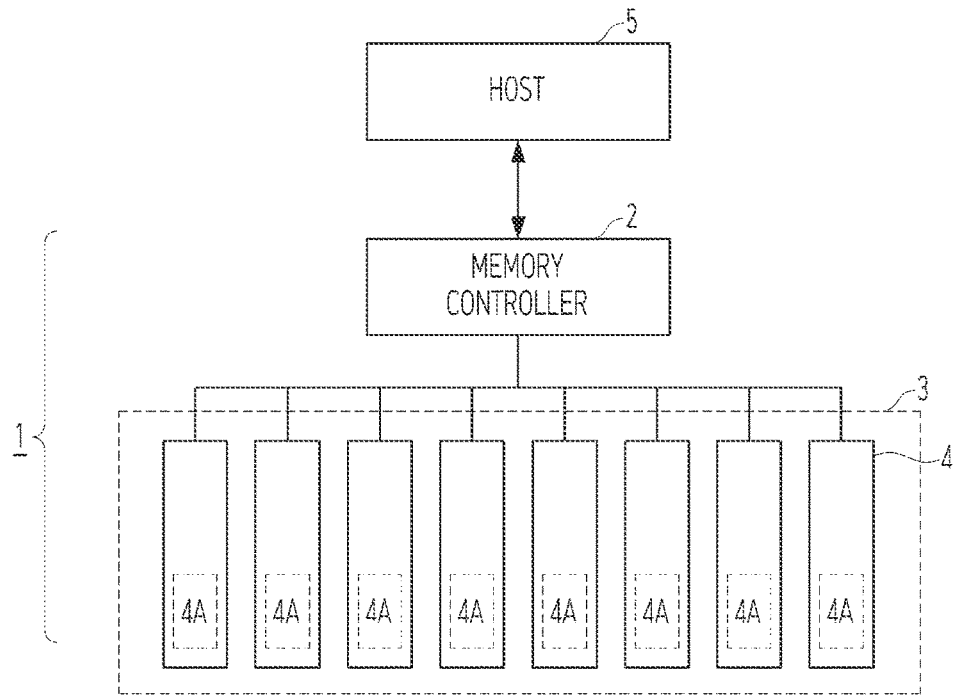
FIGS. 1A and 1B are block diagrams illustrating a known memory system.

Various embodiments of the present disclosure will be described below in more detail with reference to the accompanying drawings. The present disclosure may have embodiments in different forms and should not be construed as limited to the embodiments set forth herein. Rather, these embodiments are provided so that this disclosure will be thorough and complete, and will fully convey the scope of the present invention to those skilled in the art. Throughout this disclosure, like reference numerals refer to like parts throughout the various figures and embodiments of the present disclosure.

It will be understood that when an element is referred to as being "coupled" or "connected" to another element, it may mean that the two are directly coupled or the two are electrically connected to each other with another circuit intervening therebetween. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof. In the present disclosure, the singular forms are intended to include the plural forms as well, unless the context clearly indicates otherwise.

Figure 1B:
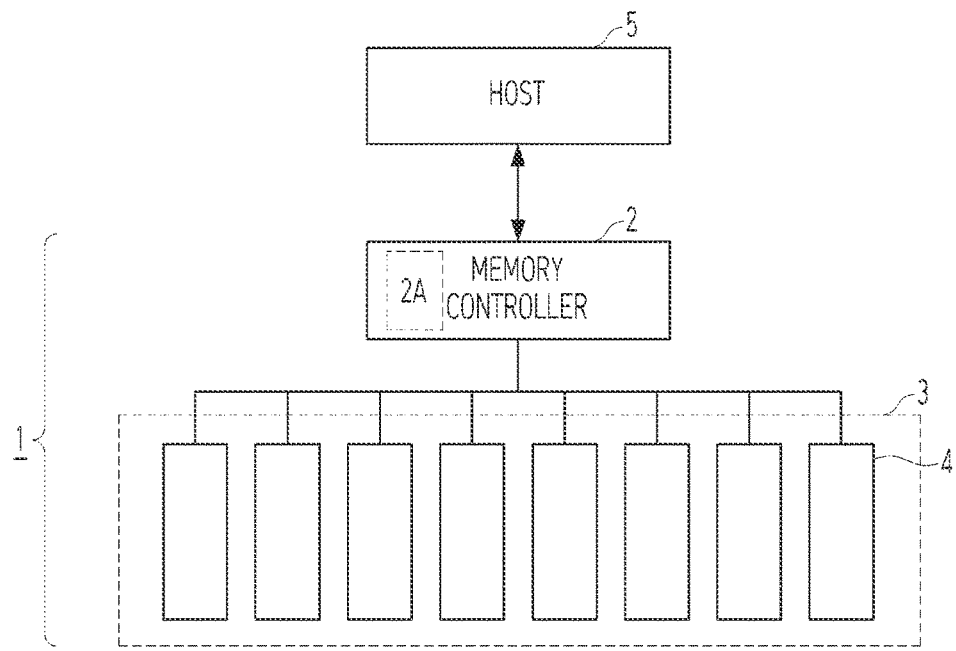

FIGS. 1A and 1B are block diagrams illustrating a memory system 1.

Referring to FIGS. 1A and 1B, the memory system 1 includes a memory controller 2 and a memory module 3.

The memory controller 2 may control an overall operation of the memory module 3 according to a request of a host 5. The memory module 3 may include a plurality of memory devices 4. The memory devices 4 may receive a command and an address in common from the memory controller 2 and respectively exchange data with the memory controller 2.

The memory devices 4 may include a plurality of memory cells coupled between a plurality of word lines (hereinafter referred to as 'rows') and a plurality of bit lines (hereinafter referred to as 'columns'). The memory controller 2 may select a preset number of memory cells by providing a row address for specifying rows of the memory devices 4 and a column address for specifying columns of the memory devices 4. The rows of the memory devices 4 included in one memory module 3 may be selected by the same row address.

Referring to FIG. 1A, each of the memory devices 4 may include a counting circuit 4A for counting the number of times of activation of each row (or the number of accesses, hereinafter referred to as 'the number of accesses'). The counting circuit 4A of each of the memory devices 4 may have substantially the same configuration and may be implemented with a plurality of row counters corresponding to the plurality of rows, respectively. Each of the row counters may generate a counting value by counting the number of inputs of a row address designating a corresponding row. The memory controller 2 may select, as a row hammer address, a row address with a maximum value among the counting values provided from the memory devices 4. The memory controller 2 may provide to the memory devices 4 a refresh command (e.g., a refresh management command) with the row hammer address, so that the memory devices 4 may perform a target refresh operation on adjacent rows of a row corresponding to the row hammer address.

As shown in FIG. 1A, when the counting circuit 4A is placed in each of the memory devices 4, the unnecessary area of the memory device (or module) increases due to the counting circuits 4A performing the same counting operation.

Referring to FIG. 1B, the memory controller 2 may include a counting circuit 2A for counting the number of accesses to each row. The counting circuit 2A may be implemented with a plurality of row counters corresponding to the plurality of rows, respectively. Each of the row counters may generate a counting value by counting the number of inputs of a row address designating a corresponding row. The memory controller 2 may calculate a row hammer address according to the counting values of the counting circuit 2A. For example, the memory controller 2 may select, as the row hammer address, a row address having a maximum value among the counting values. That is, the row hammer address may indicate a row address frequently accessed or called by the memory controller 2, among the rows of the memory devices 4. The memory controller 2 may provide to the memory devices 4 a refresh command (e.g., a refresh management command) with the row hammer address, so that the memory devices 4 may perform a target refresh operation on adjacent rows of a row corresponding to the row hammer address.

As shown in FIG. 1B, when the counting circuit 2A is placed on the memory controller 2, the memory controller 2 needs a counting capacity of (the number of rows)*(the number of bits of each row counter). For example, if 512 rows are deployed and 16-bit row counters are needed to count each row, the counting capacity for 8192 bits is required, otherwise, the performance of the memory controller 2 may be deteriorated.

To address this issue, without counting the number of accesses to all rows, a method of storing candidate addresses and input numbers of candidate addresses in entries of a content addressable memory (CAM) and tracking a row-hammer address using data stored in entries of the CAM has been proposed. However, as the area of the chip decreases due to process refining, a minimum number of activations (hereinafter referred to as a "row-hammer threshold") that can cause the row-hammering phenomenon is also decreasing, and as a result, the number of entries in the CAM to be tracked increases, making it difficult to actually perform row-hammer tracking using the CAM.

Accordingly, an embodiment of the present disclosure provides a method of preventing performance degradation of a memory controller and reducing the row-hammer risk by implementing a row-hammer tracking device using a static random access memory (SRAM) instead of a previously known CAM.

Figure 2:
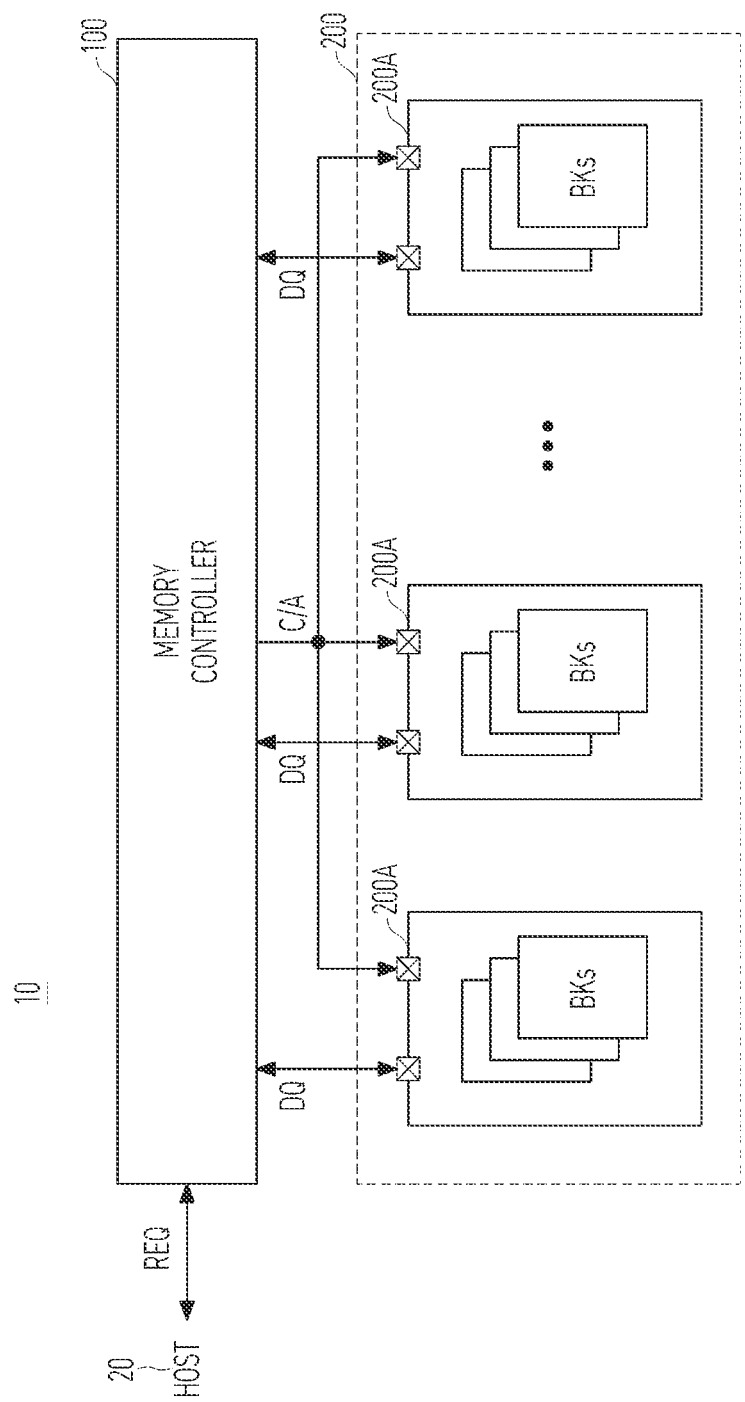
FIG. 2 is a block diagram illustrating a memory system in accordance with an embodiment of the present disclosure.

FIG. 2 is a block diagram illustrating a memory system 10 in accordance with an embodiment of the present disclosure.

Referring to FIG. 2, the memory system 10 may store data or read the stored data in response to a request provided from a host 20. The memory system 10 may be used as a main storage device or an auxiliary storage device of the host 20. The memory system 10 may be used as a device to store data under the control of the host 20, such as a mobile phone, a smartphone, an MP3 player, a laptop computer, a desktop computer, a game console, TV, a tablet PC, or an in-vehicle infotainment system.

The memory system 10 may include a memory controller 100 and at least one memory module 200.

The memory controller 100 may control an overall operation of the memory module 200 by generating a command/address signal C/A and providing the command/address signal C/A to the memory module 200, according to a request REQ of the host 20. The memory controller 100 may provide to the memory module 200 a clock together with the command/address signal C/A. For example, the memory controller 100 may provide to the memory module 200 data provided from the host during a write operation. The memory controller 100 may provide to the host 20 data read from the memory module 200 during a read operation.

The memory module 200 may operate as a buffer memory, a working memory, and a main memory for the host 20 and the memory controller 100. The memory module 200 may operate according to the command/address signal C/A issued by the memory controller 100. The memory module 200 may store data transmitted from the memory controller 100 or transmit data to the memory controller 100. In some embodiments, the memory module 200 may further include a module controller or a register clock driver, and data buffers. In other embodiments, the memory controller 100 may include a module controller or a register clock driver, and a configuration corresponding to data buffers.

The memory module 200 may include one or more memory devices 200A. The memory devices 200A may include a plurality of memory cells coupled between a plurality of rows and a plurality of columns. The memory controller 100 may select a preset number of memory cells by providing a row address for specifying the rows of the memory devices 200A and a column address for specifying the columns to the memory devices 200A.

Each of the memory devices 200A may perform an active operation, a precharge operation, a refresh operation, a read operation, or a write operation on the memory cells according to the command/address signal C/A and/or the data provided from the memory controller 100. Each of the memory devices 200A may also be referred to as a memory chip. The memory devices 200A included in the same memory module 200 may have different data input/output paths while receiving the command/address signal C/A in common. Depending on an embodiment, each of the memory devices 200A may be a DRAM (Dynamic Random Access Memory) such as DDR SDRAM (Double Data Rate Synchronous Dynamic Random Access Memory), LPDDR (Low Power Double Data Rate) SDRAM, GDDR (Graphics Double Data Rate) SDRAM, RDRAM (Rambus Dynamic Random Access Memory) and the like. According to an embodiment, the memory devices 200A may be configured with different types of memories. Hereinafter, it is described that the memory devices 200A are DRAM devices that support a double data rate (DDR) interface.

Figure 3:
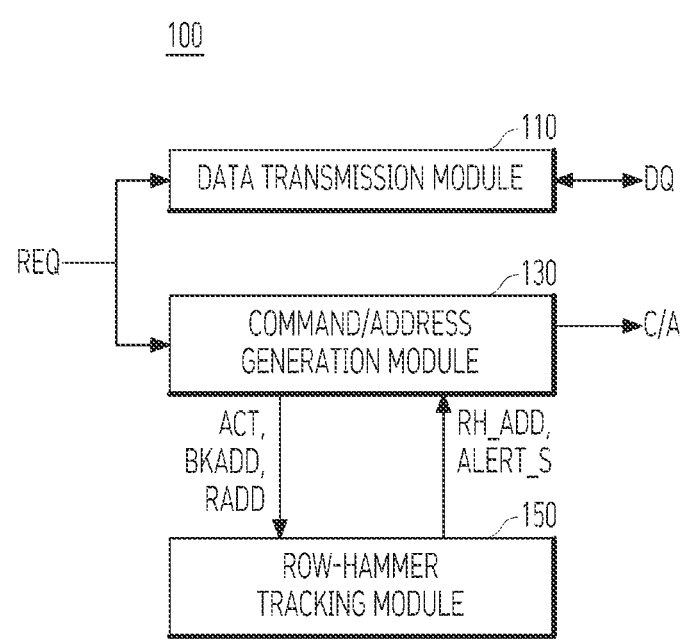
FIG. 3 is a detailed configuration diagram illustrating a memory controller in accordance with an embodiment of the present disclosure.

FIG. 3 is a detailed configuration diagram illustrating the memory controller 100 in accordance with an embodiment of the present disclosure.

Referring to FIG. 3, the memory controller 100 may include a data transmission module 110, a command/address generation module 130, and a row-hammer tracking module 150.

The data transmission module 110 may transmit to the memory module 200 data DQ corresponding to a request REQ from the host 20 during a write operation or transmit to the host 20 data DQ read from the memory module 200 during a read operation.

The command/address generation module 130 may generate a command/address signal C/A corresponding to the request REQ from the host 20 and provide the command/address signal C/A to the memory module 200.

The command/address generation module 130 may provide, as the command/address signal C/A, a bank address BKADD, a row address RADD, and a column address for respectively designating a bank, a row, and a column, together with a read command for a read operation, as the command/address signal C/A. The command/address generation module 130 may provide, as the command/address signal C/A, a bank address BKADD, a row address RADD, and a column address for respectively designating a bank, a row, and a column, together with a write command for a write operation. The command/address generation module 130 may provide a preset number of normal refresh commands as the command/address signal C/A for a refresh time (tREF) interval defined in the specification, as a time when all rows are normally refreshed.

The command/address generation module 130 may provide, as the command/address signal C/A, a bank address BKADD and a row address RADD for respectively designating a bank and a row to be active, together with an active command ACT for an active operation. In an embodiment of the present disclosure, when the active command ACT is generated, the command/address generation module 130 may provide to the row-hammer tracking module 150 the active command ACT, the bank address BKADD, and the row address RADD. When a row-hammer address RH_ADD is transmitted along with an alert signal ALERT_S from the row-hammer tracking module 150, the command/address generation module 130 may provide, as the command/address signal C/A, the row-hammer address RH_ADD for designating a bank and a row to be refreshed, together with a refresh management command. In the following embodiment, it will be described that the row-hammer address RH_ADD provided from the row-hammer tracking module 150 includes information on both the bank address and the row address.

The row-hammer tracking module 150 may collect information on banks and rows attacked by row-hammer in the memory devices 200A based on the active commands ACT, the bank address BKADD, and the row address RADD. Based on the collected information (i.e., the bank address BKADD and the row address RADD), the row-hammer tracking module 150 may generate the alert signal ALERT_S and the row-hammer address RH_ADD and transmit to the command/address generation module 130 the alert signal ALERT_S and the row-hammer address RH_ADD.

Figure 4:
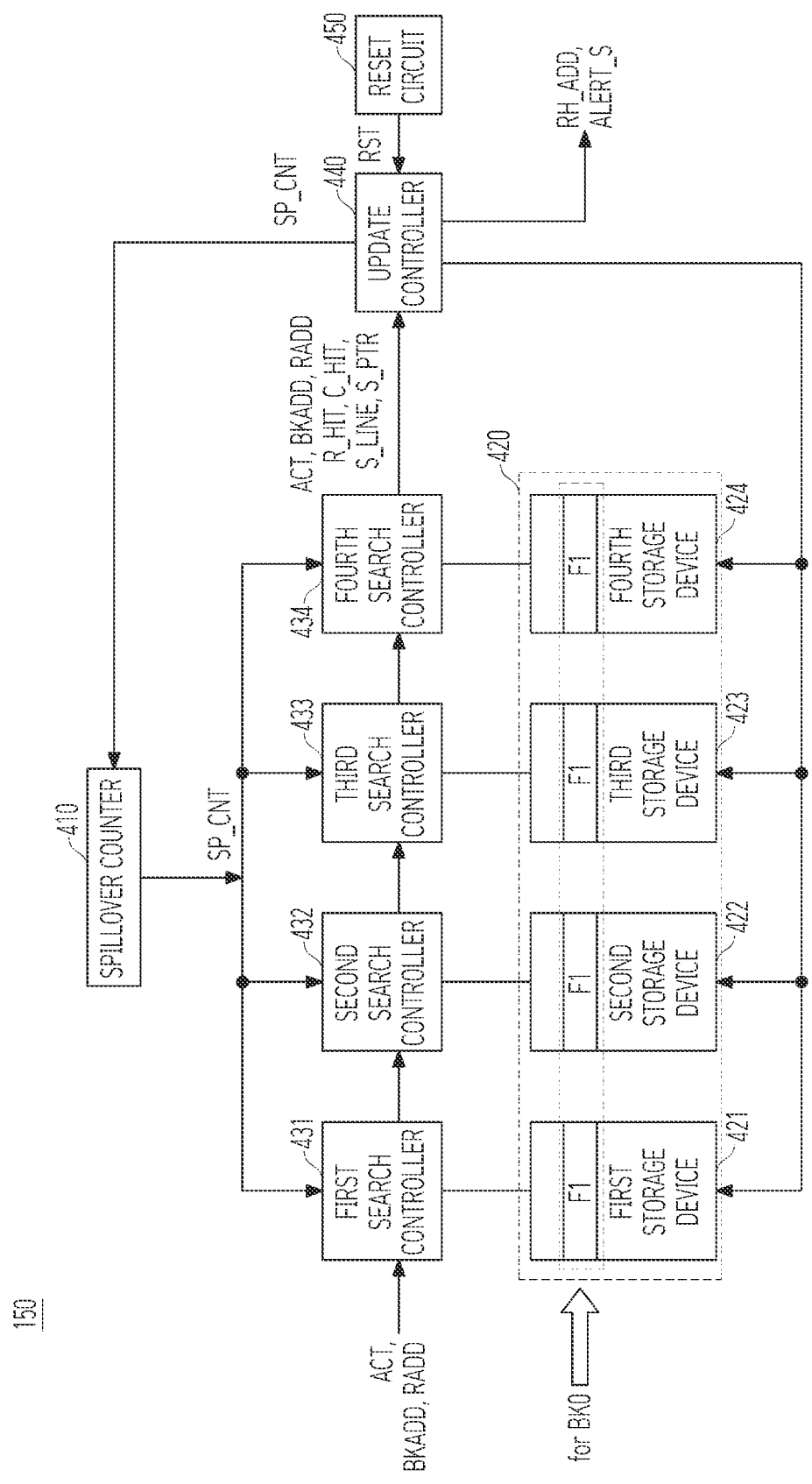
FIG. 4 is a detailed configuration diagram illustrating a row-hammer tracking module in accordance with an embodiment of the present disclosure.
Figure 5:
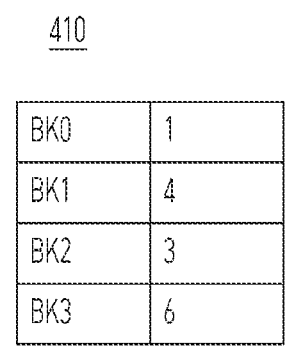

FIG. 4 is a detailed configuration diagram illustrating the row-hammer tracking module 150 in accordance with an embodiment of the present disclosure. FIG. 5 is a detailed configuration diagram illustrating a spillover counter 410 of FIG. 4.

Referring to FIG. 4, the row-hammer tracking module 150 may include the spillover counter 410, a storage device group 420 including a plurality of storage devices 421 to 424, a plurality of search controllers 431 to 434, an update controller 440, and a reset circuit 450. The plurality of storage devices 421 to 424 and the plurality of search controllers 431 to 434 may correspond one-to-one. Hereinafter, a case in which first to fourth storage devices 421 to 424 and first to fourth search controllers 431 to 434 are arranged will be described as an example.

The spillover counter 410 may include a plurality of fields corresponding to a plurality of banks, respectively. A miss-counting value SP_CNT of a corresponding bank may be stored in each field. For example, as shown in FIG. 5, when first to fourth banks BK0 to BK3 are arranged in a memory device, the spillover counter 410 may include first to fourth fields storing the miss-counting values 1, 4, 3, and 6 for the first to fourth banks BK0 to BK3, respectively.

The first to fourth storage devices 421 to 424 may include a plurality of fields corresponding to a plurality of banks, respectively. For example, the first to fourth storage devices 421 to 424 may include first fields F1 corresponding to the first bank BK0. Similarly, the first to fourth storage devices 421 to 424 may include second fields corresponding to the second bank BK1, third fields corresponding to the third bank BK2, and fourth fields corresponding to the fourth bank BK3. In each field, candidate addresses (A_ADD in FIGS. 7 and 10) of a corresponding bank and access counting values (A_CNT in FIGS. 7 and 10) for the candidate addresses may be stored. One candidate address and an access counting value thereof may constitute an entry, and one field may include a plurality of entries. Fields of the same level (e.g., k, where k is a positive integer) of the first to fourth storage devices 421 to 424 may store candidate addresses A_ADD and access counting values A_CNT for the same bank. Each of the first to fourth storage devices 421 to 424 may be configured as a static random access memory (SRAM). A detailed configuration of the first to fourth storage devices 421 to 424 will be described in detail with reference to FIGS. 7 to 11B.

The first to fourth search controllers 431 to 434 may be cascaded to each other. That is, each of the first to fourth search controllers 431 to 434 may have an input terminal coupled to an output terminal of a search controller in a previous stage, and an output terminal coupled to an input terminal of a search controller in a next stage. An output of the fourth search controller 434 disposed at a last stage of the first to fourth search controllers 431 to 434 may be provided to the update controller 440. The first to fourth search controllers 431 to 434 may sequentially read candidate addresses and access counting values stored in fields of the same level according to a clock CK. In an embodiment, the first to fourth search controllers 431 to 434 may operate in a pipeline manner in which candidate addresses and access counting values stored in different levels of fields are simultaneously read.

The first to fourth search controllers 431 to 434 may receive the bank address BKADD and the row address RADD together with the active command ACT from the command/address generation module 130. The first to fourth search controllers 431 to 434 may read candidate addresses and access counting values from fields selected according to the bank address BKADD among the fields of the first to fourth storage devices 421 to 424, and read the miss-counting value SP_CNT from a field selected according to the bank address BKADD among the fields of the spillover counter 410. The first to fourth search controllers 431 to 434 may compare the read candidate addresses with the row address RADD, and compare the read access counting values with the read miss-counting value SP_CNT, to generate an address hit signal R_HIT, a count hit signal C_HIT, and field information S_LINE and S_PTR. Each of the first to fourth search controllers 431 to 434 may transmit to the search controller in a next stage the active command ACT, the bank address BKADD, the row address RADD, the address hit signal R_HIT, the count hit signal C_HIT, and the field information S_LINE and S_PTR. In particular, the address hit signal R_HIT, the count hit signal C_HIT, and the field information S_LINE and S_PTR generated from the fourth search controller 434 may be provided to the update controller 440.

For example, the first to fourth search controllers 431 to 434 may compare the read candidate addresses with the row address RADD. The first to fourth search controllers 431 to 434 may activate the address hit signal R_HIT when one of the read candidate addresses matches the row address RADD. When all of the read candidate addresses do not match the row address RADD, the first to fourth search controllers 431 to 434 may compare the read access counting values with the read miss-counting value SP_CNT. The first to fourth search controllers 431 to 434 may activate the count hit signal C_HIT when one of the read access counting values matches the read miss-counting value SP_CNT. When the address hit signal R_HIT or the count hit signal C_HIT is activated, the first to fourth search controllers 431 to 434 may generate field information S_LINE and S_PTR for a field (hereinafter referred to as a "target field") having a hit candidate address or a hit access counting value. The field information S_LINE and S_PTR may include a position pointer S_PTR for designating a stage (or position) of a storage device including the target field and a hit entry of the target field, and a shifting line data S_LINE in which field data of the target field are stored. A detailed configuration and operation of the first to fourth search controllers 431 to 434 will be described in detail in FIGS. 13A and 13B.

The update controller 440 may receive from the fourth search controller 434 the active command ACT, the bank address BKADD, the row address RADD, the address hit signal R_HIT, the count hit signal C_HIT, and the field information S_LINE and S_PTR. According to an embodiment, the update controller 440 may receive from the command/address generation module 130 the bank address BKADD and the row address RADD along with the active command ACT.

When the address hit signal R_HIT is activated, the update controller 440 may increase the access counting value of the hit entry of the target field based on the field information S_LINE and S_PTR or generate the row-hammer address RH_ADD along with the alert signal ALERT_S. For example, the update controller 440 may compare the access counting value of the hit entry among the shifting line data S_LINE with a preset row-hammer threshold. If the access counting value is less than the row-hammer threshold value, the update controller 440 may increase the access counting value of the hit entry of the target field according to the position pointer S_PTR. If the access counting value is greater than or equal to the row-hammer threshold value, the update controller 440 may generate the row-hammer address RH_ADD using the candidate address and the bank address of the shifting line data S_LINE, and provide to the command/address generation module 130 the row-hammer address RH_ADD together with the alert signal ALERT_S. In addition, the update controller 440 may initialize the access counting value of the hit entry of the target field.

When the address hit signal R_HIT is deactivated and the count hit signal C_HIT is activated, the update controller 440 may replace the candidate address of the hit entry of the target field with the row address RADD and increase the access counting value of the hit entry. When both the address hit signal R_HIT and the count hit signal C_HIT are deactivated, the update controller 440 may increase the miss-counting value SP_CNT of the field selected according to the bank address BKADD among the fields of the spillover counter 410.

In an embodiment, the update controller 440 may initialize all fields of the first to fourth storage devices 421 to 424 in response to a reset signal RST. The update controller 440 may initialize all of the miss-counting values of the spillover counter 410 in response to the reset signal RST. A detailed operation of the update controller 440 will be described in detail with reference to FIG. 14.

The reset circuit 450 may generate the reset signal RST at refresh time (tREF) intervals defined in the specification as a time when all rows are normally refreshed. For example, when the refresh time (tREF) is set to 64 ms, the reset circuit 450 may activate the reset signal RST every 64 ms.

Hereinafter, a configuration of storage devices according to embodiments of the present disclosure will be described with reference to the drawings.

Figure 6:
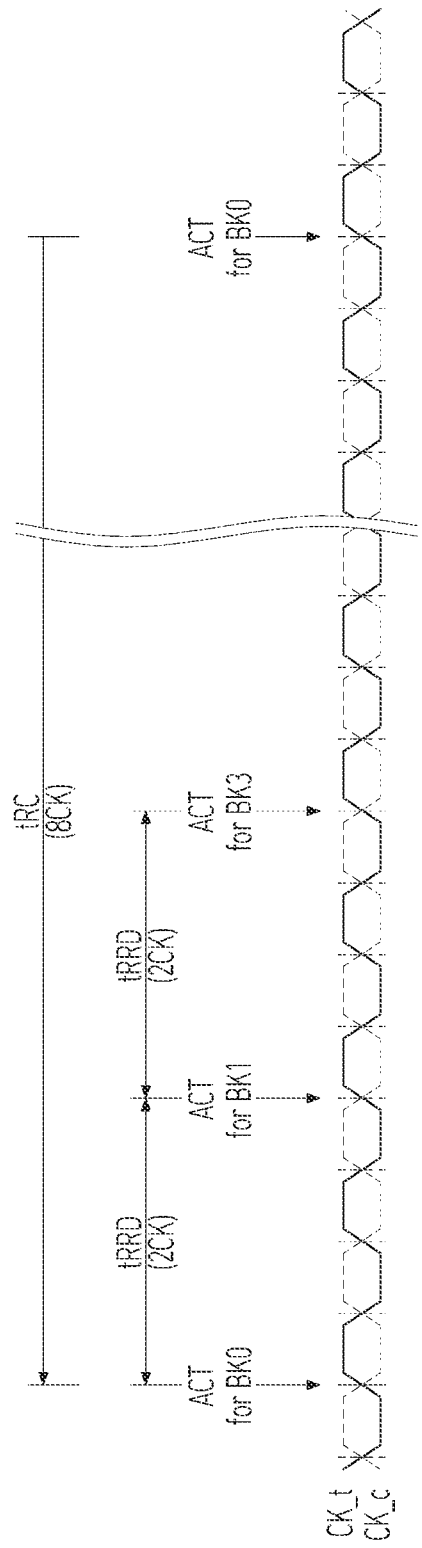
FIG. 6 is a timing diagram for describing a known first active interval (tRC) and a known second active interval (tRRD).

FIG. 6 is a timing diagram for describing a known first active interval tRC and a known second active interval tRRD.

Referring to FIG. 6, a minimum interval between consecutive active commands for the same bank is defined as the first active interval (RAS cycle time) tRC, and a minimum interval between consecutive active commands for different banks is defined as the second active interval tRRD. For example, the first active interval tRC may be set to several tens of ns, and the second active interval tRRD may be set to several ns.

In the following embodiments, the first active interval tRC and the second active interval tRRD will be described by converting the intervals from time to clock. To this end, a value obtained by dividing a first active interval and a second active interval defined in actual time basis, by a unit clock tCK, and performing a floor function "FLOOR" on the divided results will be described as the first active interval tRC and the second active interval tRRD. That is, as illustrated in FIG. 6, the active command ACT for the second bank BK1 may be input after the second active interval tRRD of 2CK from an input of the active command ACT for the first bank BK0. In addition, the active command ACT for the first bank BK0 may be input again after the first active interval tRC of 8 CK from the input of the active command ACT for the first bank BK0.

Figure 7:
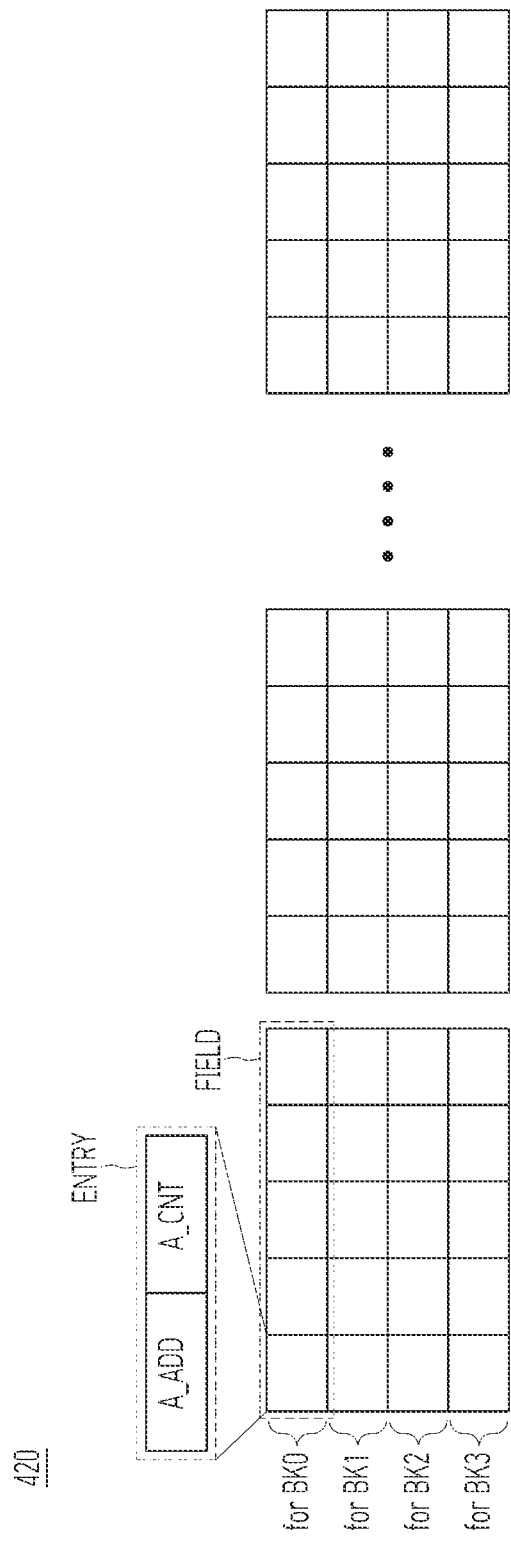
FIG. 7 is a detailed configuration diagram illustrating a storage device group in accordance with a first embodiment of the present disclosure.

FIG. 7 is a detailed configuration diagram illustrating the storage device group 420 in accordance with a first embodiment of the present disclosure.

Referring to FIG. 7, the number of storage devices in the storage device group 420 may be set according to the first active interval tRC. For example, when the first active interval tRC is set to 8 CK, eight storage devices may be provided. In this case, a depth of each of the storage devices may be set according to the number of banks. For example, when four banks BK0 to BK3 are arranged in each memory device, the depth of each storage device may be set to 4, and each storage device may include four fields.

As mentioned above, one field may include a plurality of entries, and each entry may store a candidate address A_ADD and an access counting value A_CNT thereof. The number of entries included in one field may be set as a value obtained by dividing the number of candidate addresses to be tracked by the number of storage devices. For example, if the number of candidate addresses to be tracked is 5000 and the number of storage devices is 8, the number of entries included in one field may be set to 5000/8=625.

Figure 8A:
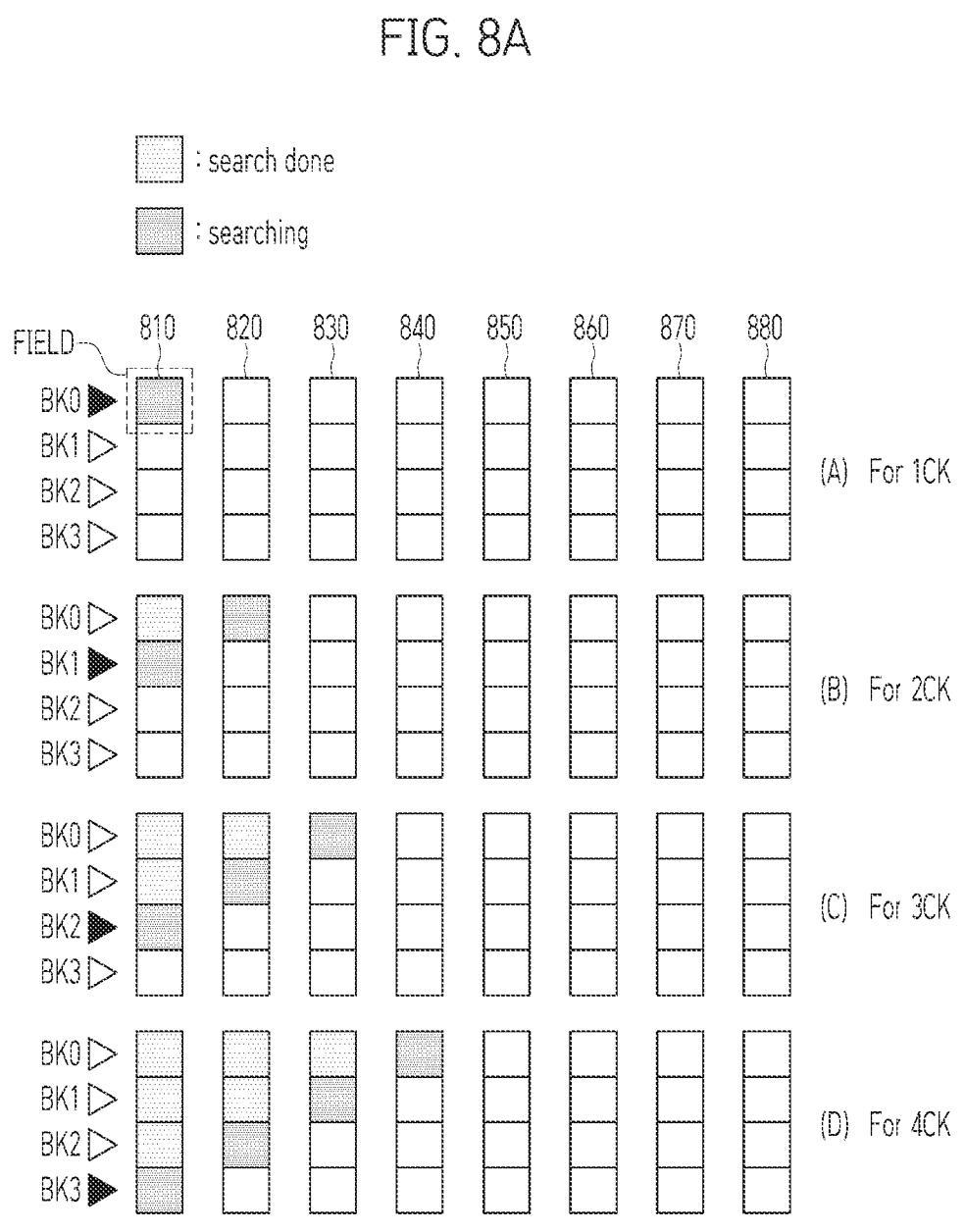
Figure 8B:
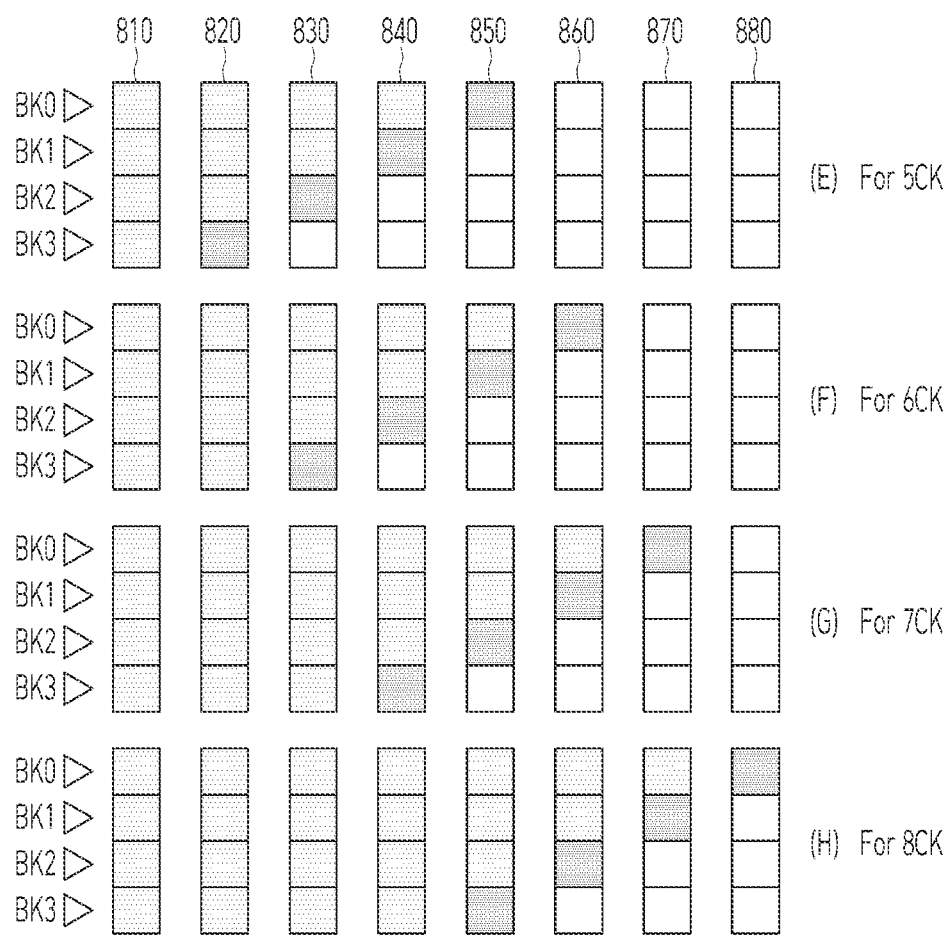
Figure 8C:
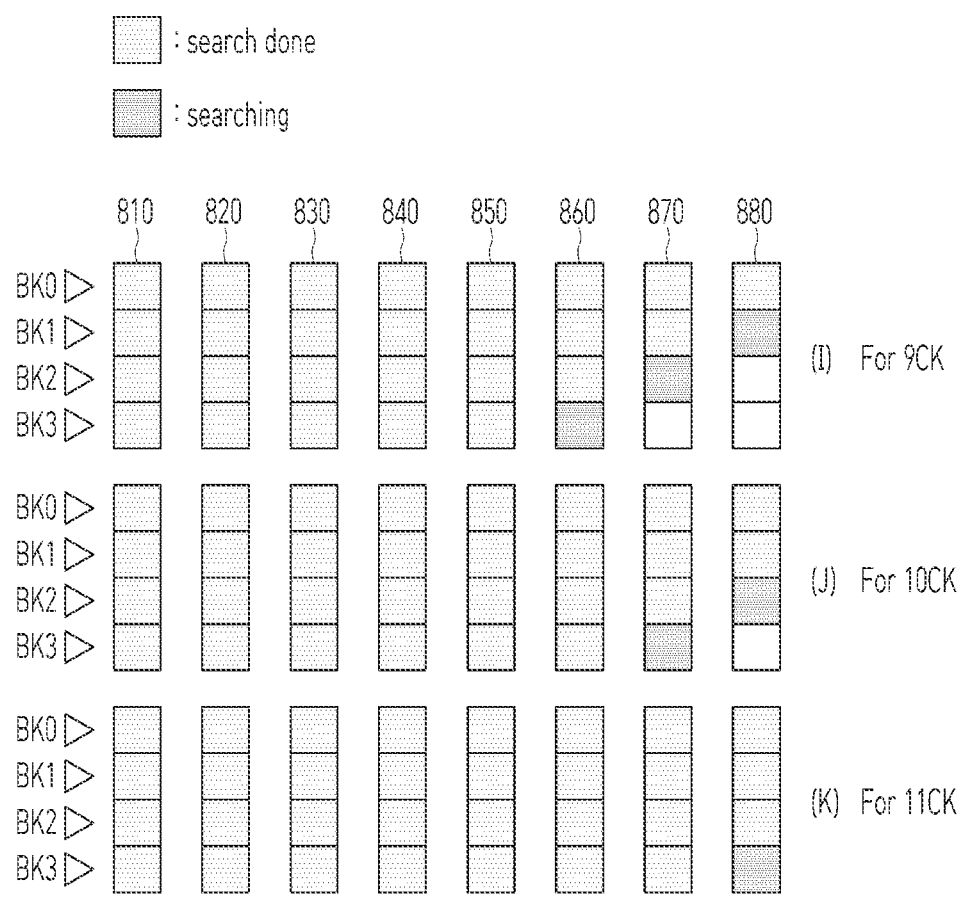

FIGS. 8A to 8C describe a read operation of the storage device group 420 of FIG. 7. In FIGS. 8A to 8C, first to fourth banks BK0 to BK3 are arranged, the first active interval tRC is set to 8CK, and the second active interval tRRD is set to 1CK. In this case, first to eighth storage devices 810 to 880 are arranged, and each storage device may be composed of first to fourth fields. Although not shown in FIGS. 8A to 8C, first to eighth search controllers corresponding to the first to eighth storage devices 810 to 880 may be disposed, respectively.

Referring to (A) of FIG. 8A, an active command ACT for the first bank BK0 is input during a first clock cycle 1CK. The first search controller may read field data including candidate addresses and access counting values stored in the first field of the first storage device 810.

Referring to (B) of FIG. 8A, the active command ACT for the second bank BK1 is input at the second active interval tRRD during a second clock cycle 2CK. The first search controller may read field data stored in the second field of the first storage device 810, and the second search controller may read field data stored in the first field of the second storage device 820.

Referring to (C) of FIG. 8A, the active command ACT for the third bank BK2 is input at the second active interval tRRD during a third clock cycle 3CK. The first search controller may read field data stored in the third field of the first storage device 810, the second search controller may read field data stored in the second field of the second storage device 820, and the third search controller may read field data stored in the first field of the third storage device 830.

Referring to (D) of FIG. 8A, the active command ACT for the fourth bank BK3 is input at the second active interval tRRD during a fourth clock cycle 4CK. The first search controller may read field data stored in the fourth field of the first storage device 810, the second search controller may read field data stored in the third field of the second storage device 820, the third search controller may read field data stored in the second field of the third storage device 830, and the fourth search controller may read field data stored in the first field of the fourth storage device 840. That is, the search controllers may read the field data of the storage devices 810 to 880 in a pipeline manner.

Referring to (E), (F), (G), and (H) of FIG. 8B, during fifth to eighth clock cycles 5CK to 8CK, the first to eighth search controllers may read field data of the first to eighth storage devices 810 to 880 in a pipeline manner described above.

Referring to (I) of FIG. 8C, after the first active interval tRC of 8CK, all fields for the first bank BK0 have been read, so even if the active command ACT is input to the first bank BK0, the next read operation may be normally performed. Referring to (I), (J), and (K) of FIG. 8C, the first to eighth search controllers may read all field data of the first to eighth storage devices 810 to 880 in a pipeline manner described above, during ninth to eleventh clock cycles 9CK to 11CK.

FIGS. 9A to 9D describe another read operation of the storage device group 420 of FIG. 7. In FIGS. 9A to 9D, first to fourth banks BK0 to BK3 are arranged, the first active interval tRC is set to 8CK, and the second active interval tRRD is set to 2CK. In this case, first to eighth storage devices 910 to 980 are arranged, and each storage device may be composed of first to fourth fields. Although not shown in FIGS. 9A to 9D, first to eighth search controllers corresponding to the first to eighth storage devices 910 to 980 may be disposed, respectively.

Figure 9A:
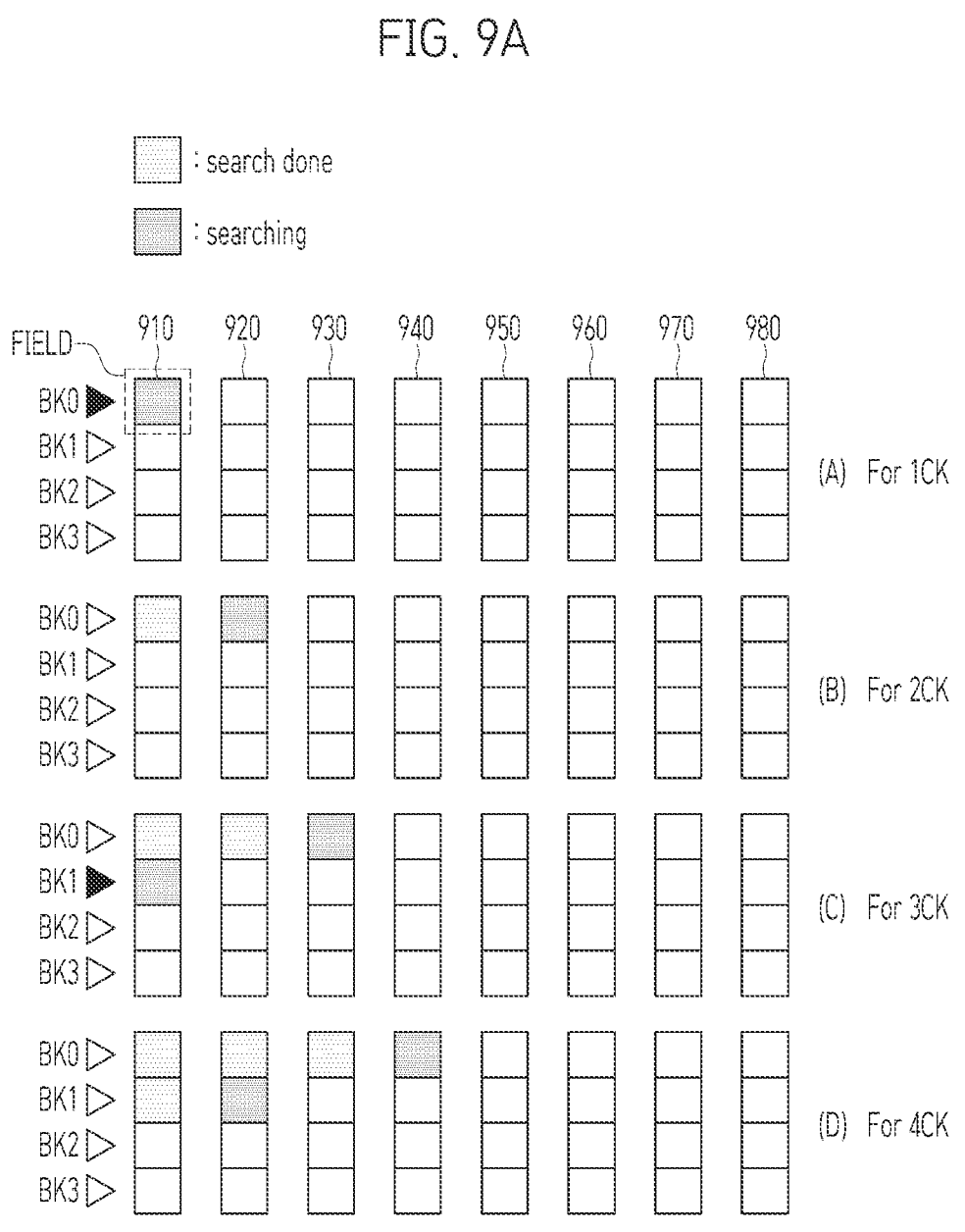

Referring to (A) of FIG. 9A, an active command ACT for the first bank BK0 is input during a first clock cycle 1CK. The first search controller may read field data stored in the first field of the first storage device 910. Referring to (B) of FIG. 9A, the second search controller may read field data stored in the first field of the second storage device 920 during a second clock cycle 2CK.

Referring to (C) of FIG. 9A, the active command ACT for the second bank BK1 is input at the second active interval tRRD during a third clock cycle 3CK. The first search controller may read field data stored in the second field of the first storage device 910, and the third search controller may read field data stored in the first field of the third storage device 930. Referring to (D) of FIG. 9A, during a fourth clock cycle 4CK, the second search controller may read field data stored in the second field of the second storage device 920, and the fourth search controller may read field data stored in the first field of the fourth storage device 940.

Figure 9B:
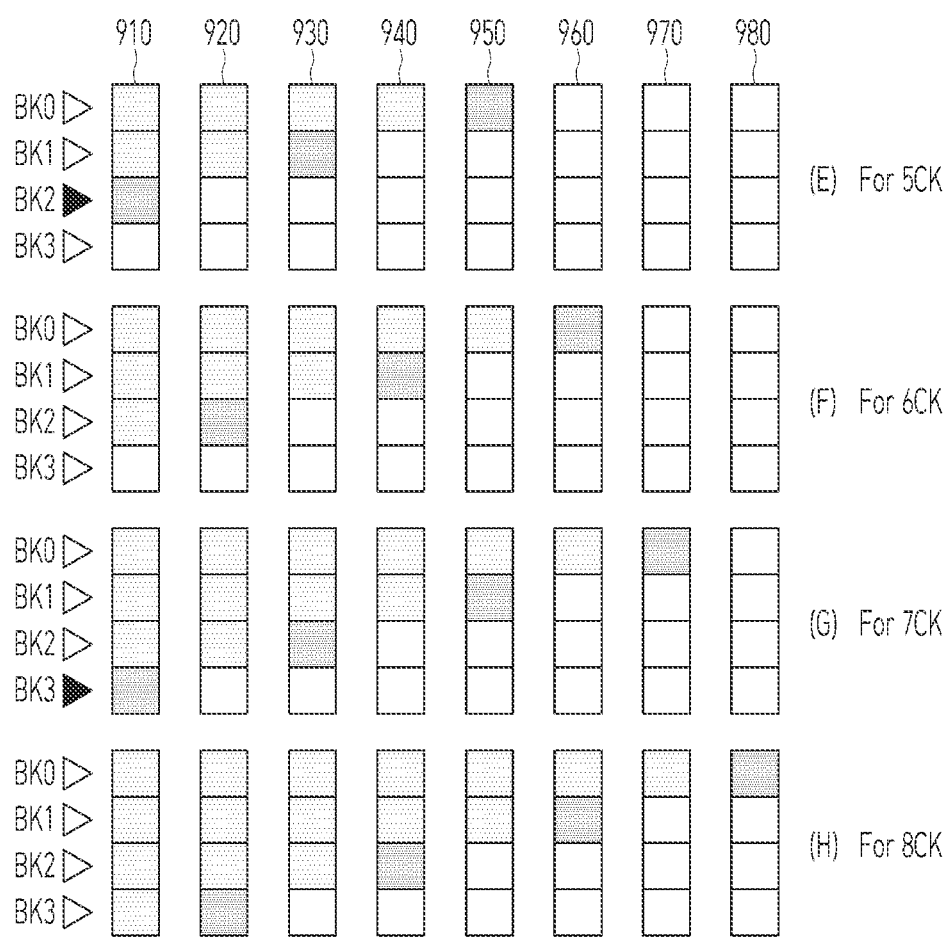

Referring to (E) of FIG. 9B, the active command ACT for the third bank BK2 is input at the second active interval tRRD during a fifth clock cycle 5CK. The first search controller may read field data stored in the third field of the first storage device 910, the third search controller may read field data stored in the second field of the third storage device 930, and the fifth search controller may read field data stored in the first field of the fifth storage device 950. Referring to (F) of FIG. 9B, during a sixth clock cycle 6CK, the second search controller may read field data stored in the third field of the second storage device 920, the fourth search controller may read field data stored in the second field of the fourth storage device 940, and the sixth search controller may read field data stored in the first field of the sixth storage device 960.

Referring to (G) of FIG. 9B, the active command ACT for the fourth bank BK3 is input at the second active interval tRRD during a seventh clock cycle 7CK. The first search controller may read field data stored in the fourth field of the first storage device 910, the third search controller may read field data stored in the third field of the third storage device 930, the fifth search controller may read field data stored in the second field of the fifth storage device 950, and the seventh search controller may read field data stored in the first field of the seventh storage device 970. Referring to (H) of FIG. 9B, during an eighth clock cycle 8CK, the second search controller reads field data stored in the fourth field of the second storage device 920, the fourth search controller reads field data stored in the third field of the fourth storage device 940, the sixth search controller reads field data stored in the second field of the sixth storage device 960, and the eighth search controller reads field data stored in the first field of the eighth storage device 980. That is, the search controllers may read field data of the storage devices 910 to 980 in a pipeline manner.

Figure 9C:
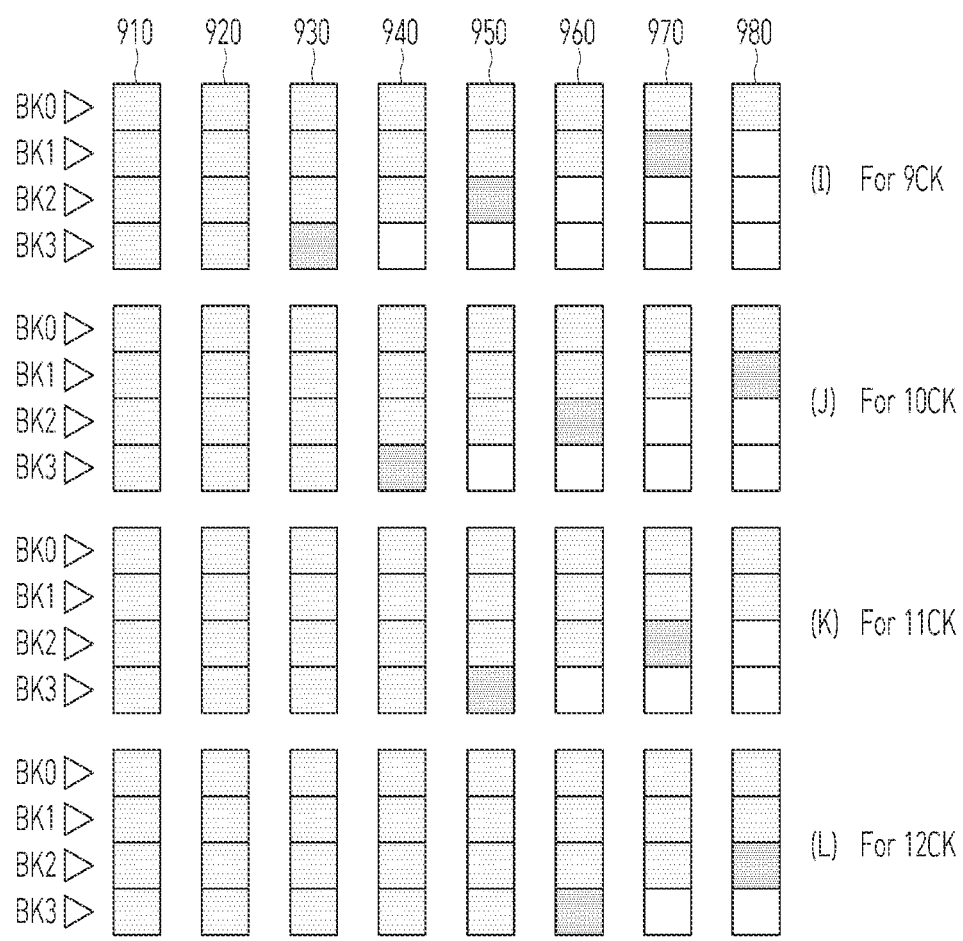
Figure 9D:
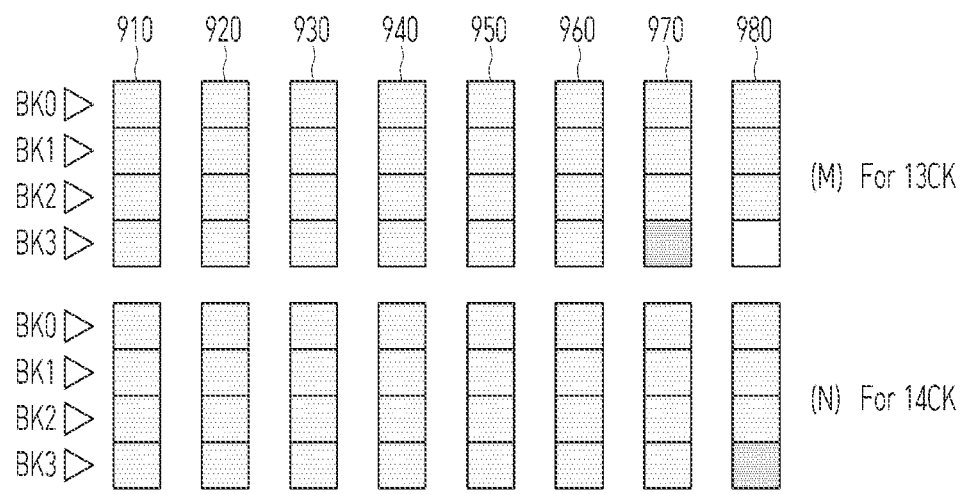

Referring to (I) of FIG. 9C, after the first active interval tRC of 8CK, all fields for the first bank BK0 have been read. Thus, even if the active command ACT is input to the first bank BK0, the next read operation may be normally performed. Referring to (I), (J), (K), (L), (M), and (N) of FIGS. 9C and 9D, the first to eighth search controllers may read all field data of the first to eighth storage devices 910 to 980 in a pipeline manner described above, during ninth to fourteenth clock cycles 9CK to 14CK.

As shown in FIGS. 8A to 9D, the search controllers of the first embodiment may read candidate addresses and access counting values stored in a k-th field of an x-th storage device while reading candidate addresses and access counting values stored in an m-th field of an (x+y)-th storage device, where k is a positive integer, x is a positive integer, and m is a positive integer different from x. At this time, y may be set based on the second active interval tRRD. For reference, in the examples described in FIGS. 8A to 9D, if it is determined that one of the read candidate addresses matches the row address RADD, the subsequent search controllers may stop further reading operations for the same bank.

In the embodiments described in FIGS. 8A to 9D, the case where the active command ACT is sequentially input to the first to fourth banks BK0 to BK3 has been described as an example, but the embodiments are not limited thereto. The active command ACT may be input regardless of the order of the banks. For example, the active command ACT may be input to the second bank BK1 first, and the active command ACT may be input to the fourth bank BK3 after the second active interval tRRD.

Figure 10:
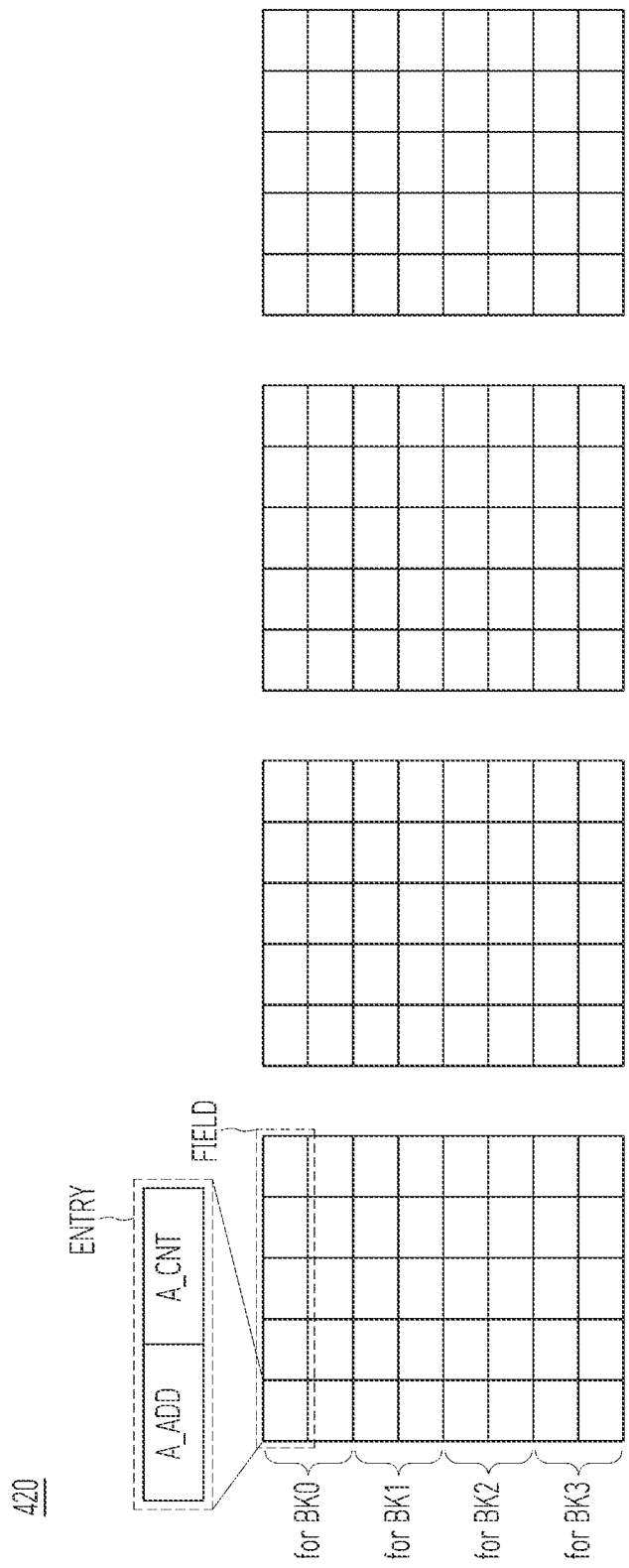
FIG. 10 is a detailed configuration diagram illustrating a storage device group according to a second embodiment of the present disclosure.

FIG. 10 is a detailed configuration diagram illustrating the storage device group 420 according to a second embodiment of the present disclosure.

Referring to FIG. 10, the number of storage devices in the storage device group 420 may be set according to a ratio of the first active interval tRC and the second active interval tRRD. For example, when the first active interval tRC is set to 8CK and the second active interval tRRD is set to 2CK, four storage devices may be provided. In this case, a depth of each of the storage devices may be set according to a product of the number of banks and the second active interval tRRD. For example, when four banks BK0 to BK3 are arranged in each memory device, the depth of each storage device is set to 4*2=8, that is, each storage device may include eight fields, that is, two fields for each bank.

Figure 11A:
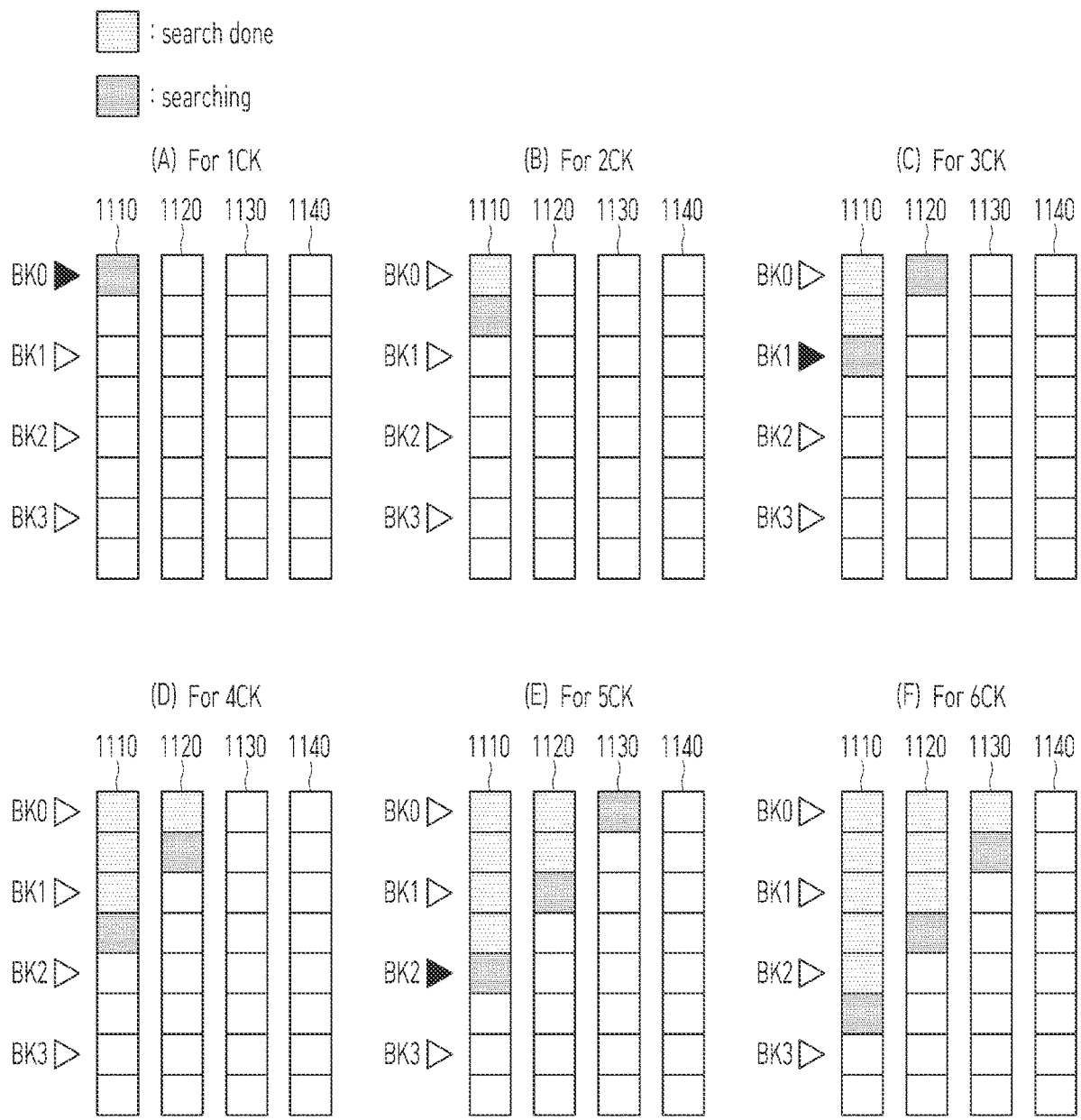

FIGS. 11A and 11B describe a read operation of the storage device of FIG. 10. In FIGS. 11A and 11B, first to fourth banks BK0 to BK3 are arranged, the first active interval tRC is set to 8CK, and the second active interval tRRD is set to 2CK. In this case, first to fourth storage devices 1110 to 1140 are arranged, and each storage device may be configured by first to eighth fields. Although not shown in the drawing, first to fourth search controllers corresponding to the first to fourth storage devices 1110 to 1140 may be disposed, respectively.

Referring to (A) of FIG. 11A, an active command ACT for the first bank BK0 is input during a first clock cycle 1CK. The first search controller may read field data stored in the first field of the first storage device 1110. Referring to (B) of FIG. 11A, the first search controller may read field data stored in the second field of the first storage device 1110 during a second clock cycle 2CK.

Referring to (C) of FIG. 11A, the active command ACT for the second bank BK1 is input at the second active interval tRRD during a third clock cycle 3CK. The first search controller may read field data stored in the third field of the first storage device 1110, and the second search controller may read field data stored in the first field of the second storage device 1120. Referring to (D) of FIG. 11A, during a fourth clock cycle 4CK, the first search controller may read field data stored in the fourth field of the first storage device 1110, and the second search controller may read field data stored in the second field of the second storage device 1120.

Referring to (E) of FIG. 11A, the active command ACT for the third bank BK2 is input at the second active interval tRRD during a fifth clock cycle 5CK. The first search controller may read field data stored in the fifth field of the first storage device 1110, the second search controller may read field data stored in the third field of the second storage device 1120, and the third search controller may read field data stored in the first field of the third storage device 1130. Referring to (F) of FIG. 11A, during a sixth clock cycle 6CK, the first search controller may read field data stored in the sixth field of the first storage device 1110, the second search controller may read field data stored in the fourth field of the second storage device 1120, and the third search controller may read field data stored in the second field of the third storage device 1130.

Referring to (G) of FIG. 11B, the active command ACT for the fourth bank BK3 is input at the second active interval tRRD during a seventh clock cycle 7CK. The first search controller may read field data stored in the seventh field of the first storage device 1110, the second search controller may read field data stored in the fifth field of the second storage device 1120, the third search controller may read field data stored in the third field of the third storage device 1130, and the fourth search controller may read field data stored in the first field of the fourth storage device 1140. Referring to (H) of FIG. 11B, during an eighth clock cycle 8CK, the first search controller reads field data stored in the eighth field of the first storage device 1110, the second search controller reads field data stored in the sixth field of the second storage device 1120, the third search controller reads field data stored in the fourth field of the third storage device 1130, and the fourth search controller reads field data stored in the second field of the fourth storage device 1140. That is, the search controllers may read the field data of the storage devices 1110 to 1140 in a pipeline manner.

Referring to (I) of FIG. 11B, after the first active interval tRC of 8CK, all fields for the first bank BK0 have been read. Thus, even if the active command ACT is input to the first bank BK0, the next read operation may be normally performed. Referring to (I), (J), and (K) of FIG. 11B, the first to fourth search controllers may read all field data of the first to fourth storage devices 1110 to 1140 in a pipeline manner described above, during ninth to fourteenth clock cycles 9CK to 14CK.

Figure 12B:
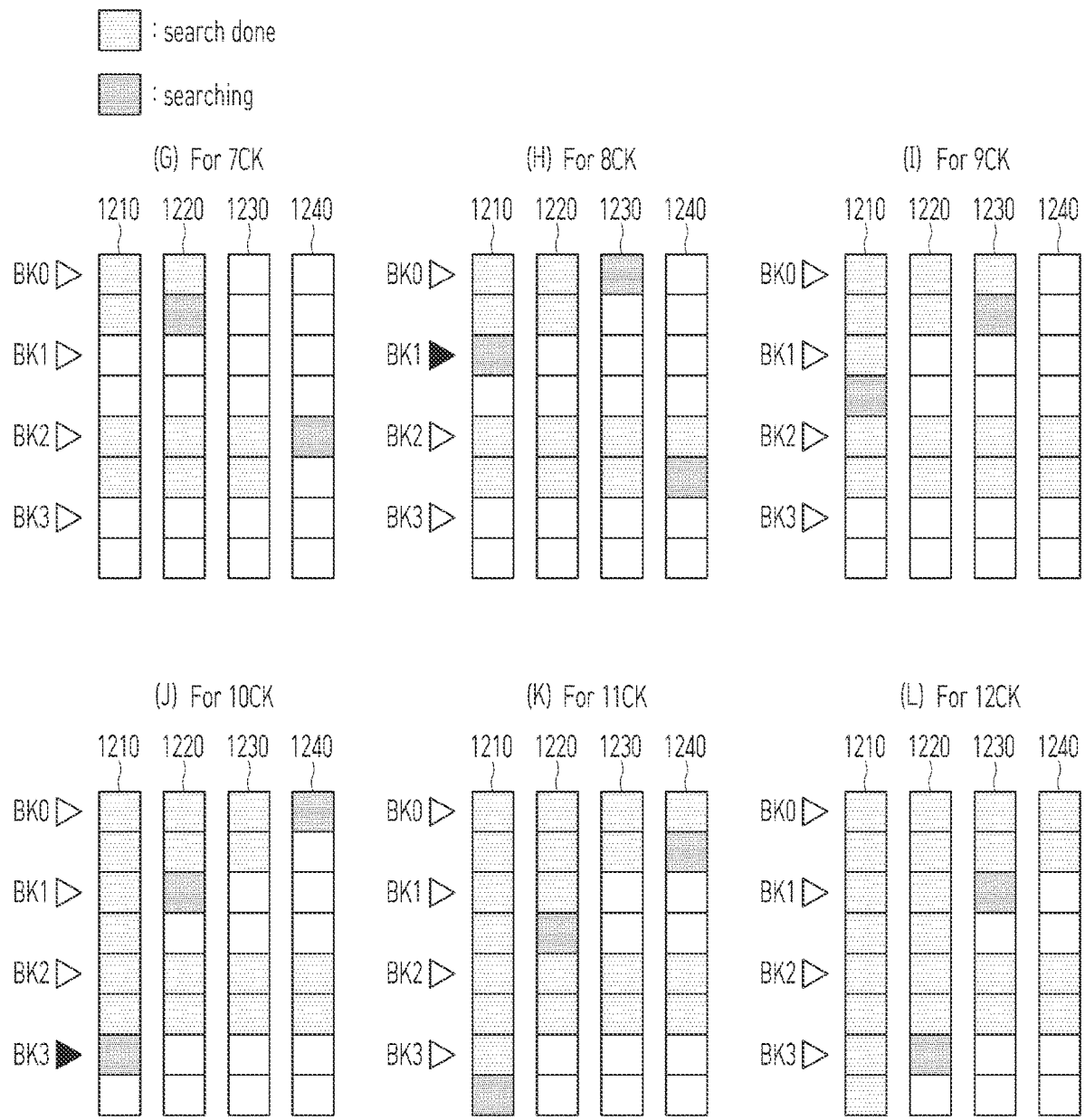

FIGS. 12A to 12C describe another read operation of the storage device group 420 of FIG. 10. FIGS. 12A to 12C illustrate a case in which the active command ACT is input regardless of the order of the first to fourth banks BK0 to BK3 under the same condition as FIGS. 11A and 11B.

Referring to (A) of FIG. 12A, an active command ACT for the third bank BK2 is input during a first clock cycle 1CK. The first search controller may read field data stored in the fifth field of the first storage device 1210. Referring to (B) of FIG. 12A, during a second clock cycle 2CK, the first search controller may read field data stored in the sixth field of the first storage device 1210. Referring to (C) of FIG. 12A, since the second active interval tRRD has passed but the additional active command ACT has not been input, the second search controller may read field data stored in the fifth field of the second storage device 1220 during a third clock cycle 3CK.

Referring to (D) of FIG. 12A, the active command ACT for the first bank BK0 is input during a fourth clock cycle 4CK. The first search controller may read field data stored in the first field of the first storage device 1210, and the second search controller may read field data stored in the sixth field of the second storage device 1220. Referring to (E) of FIG. 12A, during a fifth clock cycle 5CK, the first search controller may read field data stored in the second field of the first storage device 1210, and the third search controller may read field data stored in the fifth field of the third storage device 1230. Referring to (F) of FIG. 12A, during a sixth clock cycle 6CK, the second search controller may read field data stored in the first field of the second storage device 1220, and the third search controller may read field data stored in the sixth field of the third storage device 1230. Referring to (G) of FIG. 12B, the second search controller may read field data stored in the second field of the second storage device 1220, and the fourth search controller may read field data stored in the fifth field of the fourth storage device 1240.

Referring to (H) of FIG. 12B, the active command ACT for the second bank BK1 is input during an eighth clock cycle 8CK. The first search controller may read field data stored in the third field of the first storage device 1210, the third search controller may read field data stored in the first field of the third storage device 1230, and the fourth search controller may read field data stored in the sixth field of the fourth storage device 1240. Referring to (I) of FIG. 12B, during a ninth clock cycle 9CK, the first search controller may read field data stored in the fourth field of the first storage device 1210, and the third search controller may read field data stored in the second field of the third storage device 1230.

Referring to (J) of FIG. 12B, the active command ACT for the fourth bank BK3 is input during a tenth clock cycle 10CK. The first search controller may read field data stored in the seventh field of the first storage device 1210, the second search controller may read field data stored in the third field of the second storage device 1220, and the fourth search controller may read field data stored in the first field of the fourth storage device 1240. In this way, referring to (K), (L), (M), (N), (O), and (P) of FIG. 12B and FIG. 12C, the first to fourth search controllers may read all field data of the first to fourth storage devices 1210 to 1240 in a pipeline manner described above, during eleventh to seventeenth clock cycles 11CK to 17CK.

As shown in FIGS. 11A to 12B, the search controllers of the second embodiment may read candidate addresses and access counting values stored in a k-th field of an x-th storage device while reading candidate addresses and access counting values stored in a (k–y)-th field of a z-th storage device, where k is a positive integer, x is a positive integer, and z is a positive integer different from x. At this time, y may be set based on the second active interval tRRD and the order of banks in which the active command is input. For reference, in the example described in FIGS. 8A to 9D, if it is determined that one of the read candidate addresses matches the row address RADD, the subsequent search controllers may stop further reading operations for the same bank.

In the specification of the memory device, a time window to which four active commands may be applied is defined as a third active interval (four active window) tFAW. In an embodiment, the row-hammer tracking module 150 of FIG. 3 may arrange a buffer for storing four consecutive active commands in front of the storage device group 420. The storage device group 420 may receive an output of the buffer. In this case, the number of storage devices in the storage device group 420 may be set according to the number obtained by multiplying the ratio of the first active interval tRC and the third active interval tFAW by a particular number (e.g., 4). For example, when the first active interval tRC is set to 8CK and the third active interval tFAW is set to 8CK, (8/8)*4=4 storage devices may be provided. In addition, a depth of each of the storage devices may be set according to a value obtained by dividing a product of the third active interval tFAW and the number of banks, by a particular number (e.g., 4). For example, when four banks BK0 to BK3 are arranged for each memory device, the depth of each storage device is set to (4*8)/4=8, and each storage device may include eight fields, that is, two fields for each bank.

Figure 13A:
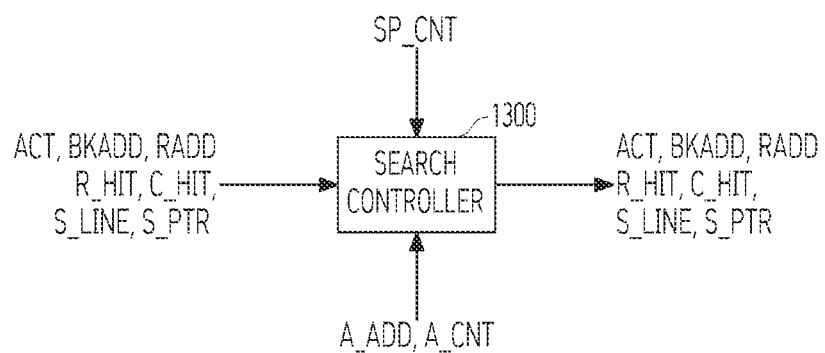
FIGS. 13A and 13B are a block diagram and a flowchart illustrating an operation of a search controller according to an embodiment of the present disclosure.
Figure 13B:
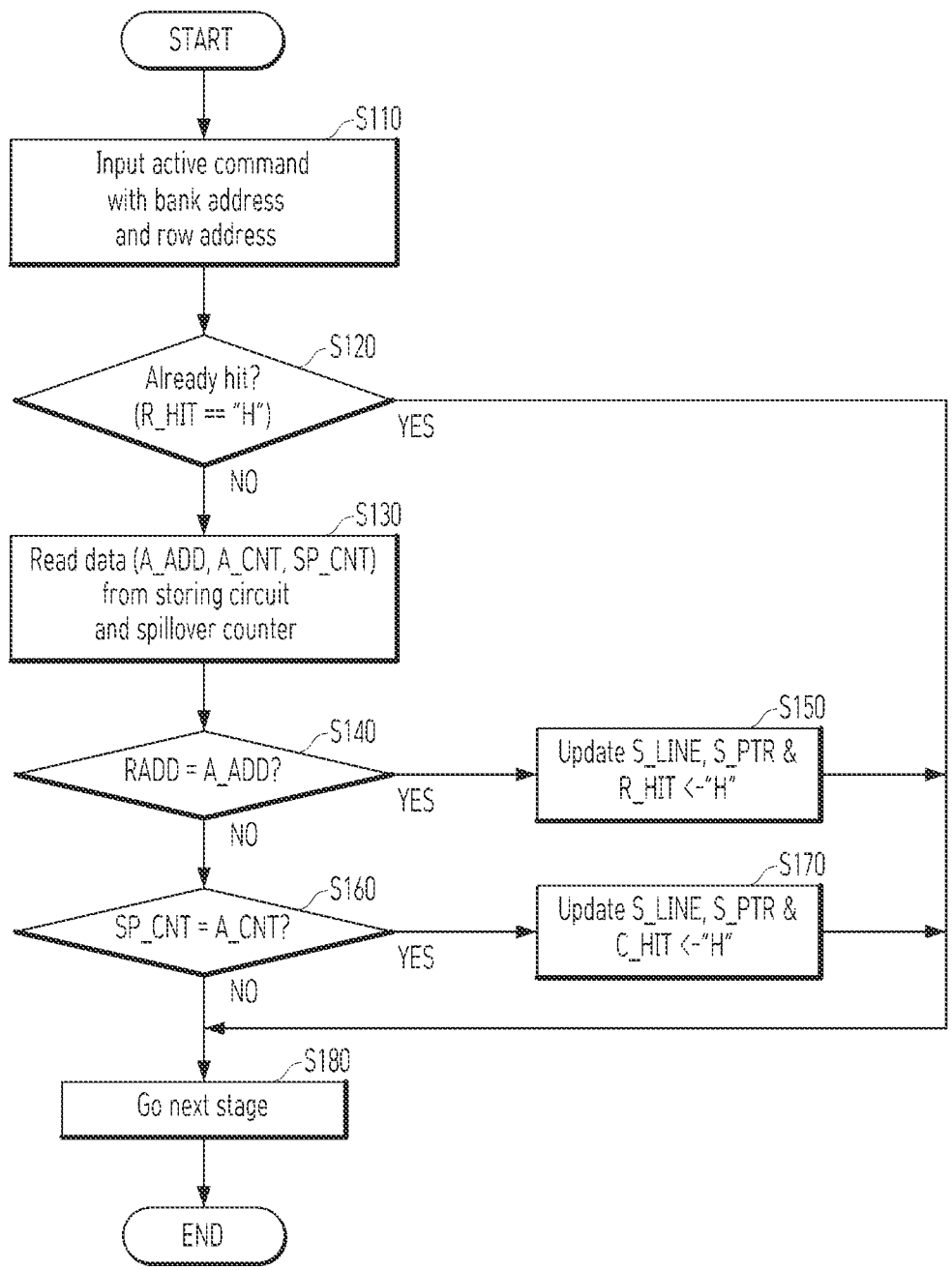

FIGS. 13A and 13B are a block diagram and a flowchart illustrating an operation of a search controller according to an embodiment of the present disclosure, respectively.

Referring to FIG. 13A, input/output signals of a search controller 1300 among the first to fourth search controllers 431 to 434 shown in FIG. 4 are shown.

The search controller 1300 may read the candidate addresses A_ADD and the access counting values A_CNT from the field of the storage device according to the bank address BKADD, and read the miss-counting value SP_CNT from the field of the spillover counter 410. The search controller 1300 may compare the read candidate addresses A_ADD and the read access counting values A_ADD with the row address RADD and the read miss-counting value SP_CNT, respectively, to generate the address hit signal R_HIT, the count hit signal C_HIT, and the field information S_LINE and S_PTR. The search controller 1300 may transmit to the next search controller the active command ACT, the bank address BKADD, the row address RADD, the address hit signal R_HIT, the count hit signal C_HIT, and the field information S_LINE and S_PTR.

For reference, among cascade-connected search controllers, a search controller disposed at a first stage may receive the bank address BKADD and the row address RADD along with the active command ACT from the command/address generation module 130. The search controller disposed at the first stage may receive the address hit signal R_HIT, the count hit signal C_HIT, and the field information S_LINE and S_PTR set to an initial value (e.g., 0).

Referring to FIG. 13B, an operation of the search controller 1300 is shown.

The bank address BKADD and the row address RADD are input together with the active command ACT (at S110).

When the address hit signal R_HIT transmitted from the previous search controller is already activated ("YES" in S120), the search controller 1300 may transmit signals received from the previous search controller to the next search controller as they are (at S180). On the other hand, when the address hit signal R_HIT is deactivated ("NO" in S120), the search controller 1300 may select one of the fields of the storage device and the fields of the spillover counter 410 according to the bank address BKADD. Accordingly, the candidate addresses A_ADD and the access counting values A_CNT may be read from the storage device, and the miss-counting value SP_CNT may be read from the spillover counter 410 (at S130).

The search controller 1300 may compare the row address RADD with the candidate addresses A_ADD (at S140). When one of the candidate addresses A_ADD matches the row address RADD ("YES" of S140), the search controller 1300 may activate the address hit signal R_HIT and generate (or update) the field information S_LINE and S_PTR for the field (i.e., the target field) of the storage device (at S150). In this case, the field information S_LINE and S_PTR may include the position pointer S_PTR for designating a stage of a storage device including a target field and a hit entry of the target field, and the shifting line data S_LINE in which field data of the target field are stored. Thereafter, the search controller 1300 may transmit to the next search controller the address hit signal R_HIT, the count hit signal C_HIT, and the field information S_LINE and S_PTR together with the active command ACT, the bank address BKADD and the row address RADD (at S180).

When all of the candidate addresses A_ADD do not match the row address RADD ("NO" in S140), the search controller 1300 may compare the miss-counting value SP_CNT with the access counting values A_ADD (at S160). When one of the access counting values A_ADD matches the miss-counting value SP_CNT ("YES" of S160), the search controller 1300 may activate the count hit signal C_HIT and generate (or update) the field information S_LINE and S_PTR for the target field (at S170). Thereafter, the search controller 1300 may transmit to the next search controller the address hit signal R_HIT, the count hit signal C_HIT, and the field information S_LINE and S_PTR together with the active command ACT, the bank address BKADD and the row address RADD (at S180).

In a configuration of the arranged storage devices as described in the second embodiment, the operation described in FIG. 13B may be repeatedly performed a number of times corresponding to the second active interval tRRD.

FIG. 14 is a flowchart for describing an operation of the update controller 440 according to an embodiment of the present disclosure.

Referring to FIG. 14, when the reset signal RST is activated ("YES" in S210), the update controller 440 may initialize all field data of the storage devices 421 to 424 and the miss-counting values of the spillover counter 410 (at S220). For example, since the reset signal RST is activated at a constant period, the storage devices 421 to 424 and the spillover counter 410 may be initialized at the constant period. For reference, to initialize all field data of the storage devices 421 to 424, clock cycles corresponding to the number of fields of each storage device may be required. For example, if each storage device has four fields, at least four clock cycles are required.

When the bank address BKADD and the row address RADD are inputted together with the active command ACT (S230), the update controller 440 may receive from the fourth search controller 434 the active command ACT, the bank address BKADD, the row address RADD, the address hit signal R_HIT, the count hit signal C_HIT, and the field information S_LINE and S_PTR.

When the address hit signal R_HIT is activated ("YES" in S240), the update controller 440 may compare the access counting value A_CNT of the shifting line data S_LINE with a preset row-hammer threshold RH_T (at S250). In this case, the hit entry is selected by the position pointer S_PTR, and the access counting value A_CNT of the hit entry may be compared with the row-hammer threshold RH_T. If the access counting value A_CNT of the hit entry is less than the row-hammer threshold RH_T ("NO" in S250), the update controller 440 may increase the access counting value A_CNT of the hit entry by a particular value, e.g., "+1" (at S252). Thereafter, the update controller 440 may write (or update) the shifting line data S_LINE into the target field according to the position pointer S_PTR and the bank address BKADD (at S258). Accordingly, the access counting value of the hit entry of the target field may increase.

On the other hand, if the access counting value A_CNT of the hit entry is greater than or equal to the row-hammer threshold RH_T ("YES" of S250), the update controller 440 may generate the row-hammer address RH_ADD using the candidate address A_ADD and the bank address BKADD of the hit entry of the shifting line data S_LINE, and output the row-hammer address RH_ADD along with the alert signal ALERT_S indicating that an row-hammer situation has occurred (at S254). In addition, the update controller 440 may set the access counting value A_CNT of the hit entry to a specific value (e.g., 0) (at S256). Thereafter, the update controller 440 may write (or update) the shifting line data S_LINE into the target field according to the position pointer S_PTR and the bank address BKADD (at S258).

When the address hit signal R_HIT is deactivated ("NO" in S240) and the count hit signal C_HIT is activated ("YES" in S260), the update controller 440 may replace the candidate address A_ADD of the hit entry of the shifting line data S_LINE, with the row address RADD, and increase the access counting value A_CNT of the hit entry of the shifting line data S_LINE by a particular value, e.g., "+1" (at S264). Thereafter, the update controller 440 may write (or update)

the shifting line data S_LINE into the target field according to the position pointer S_PTR and the bank address BKADD (at S258). Accordingly, both the candidate address and the access counting value of the hit entry of the target field may be updated.

When the count hit signal C_HIT is deactivated ("NO" in S260), the update controller 440 may increase the miss-counting value SP_CNT of the field selected according to the bank address BKADD among the fields of the spillover counter 410 (at S262).

Hereinafter, a row-hammer tracking method according to an embodiment of the present disclosure will be described as a specific example.

FIGS. 15A to 15M describe a row-hammer tracking method according to an embodiment of the present disclosure.

Figure 15A:
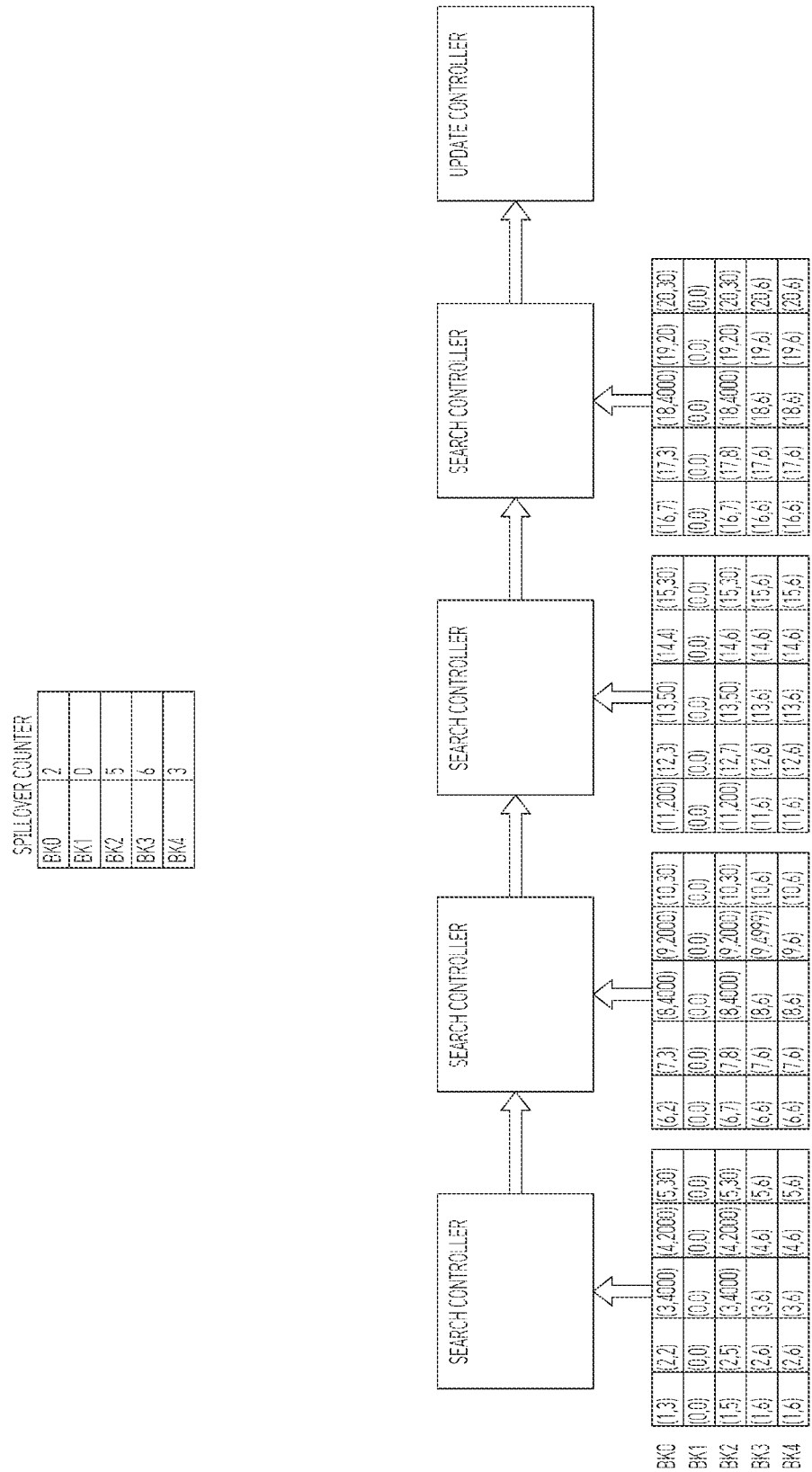
FIGS. 15A to 15M describe a row-hammer tracking method according to an embodiment of the present disclosure.

Referring to FIG. 15A, first to fifth banks BK0 to BK4 are arranged, a first active interval tRC is set to 4CK, and a second active interval tRRD is set to 1CK. In this case, first to fourth storage devices are disposed, and each storage device may include first to fifth fields corresponding to the first to fifth banks BK0 to BK4, respectively. In FIG. 15A, the first to fifth entries are arranged in each field, and a row-hammer threshold RH_T is set to 5000−1=4999.

Figure 15B:
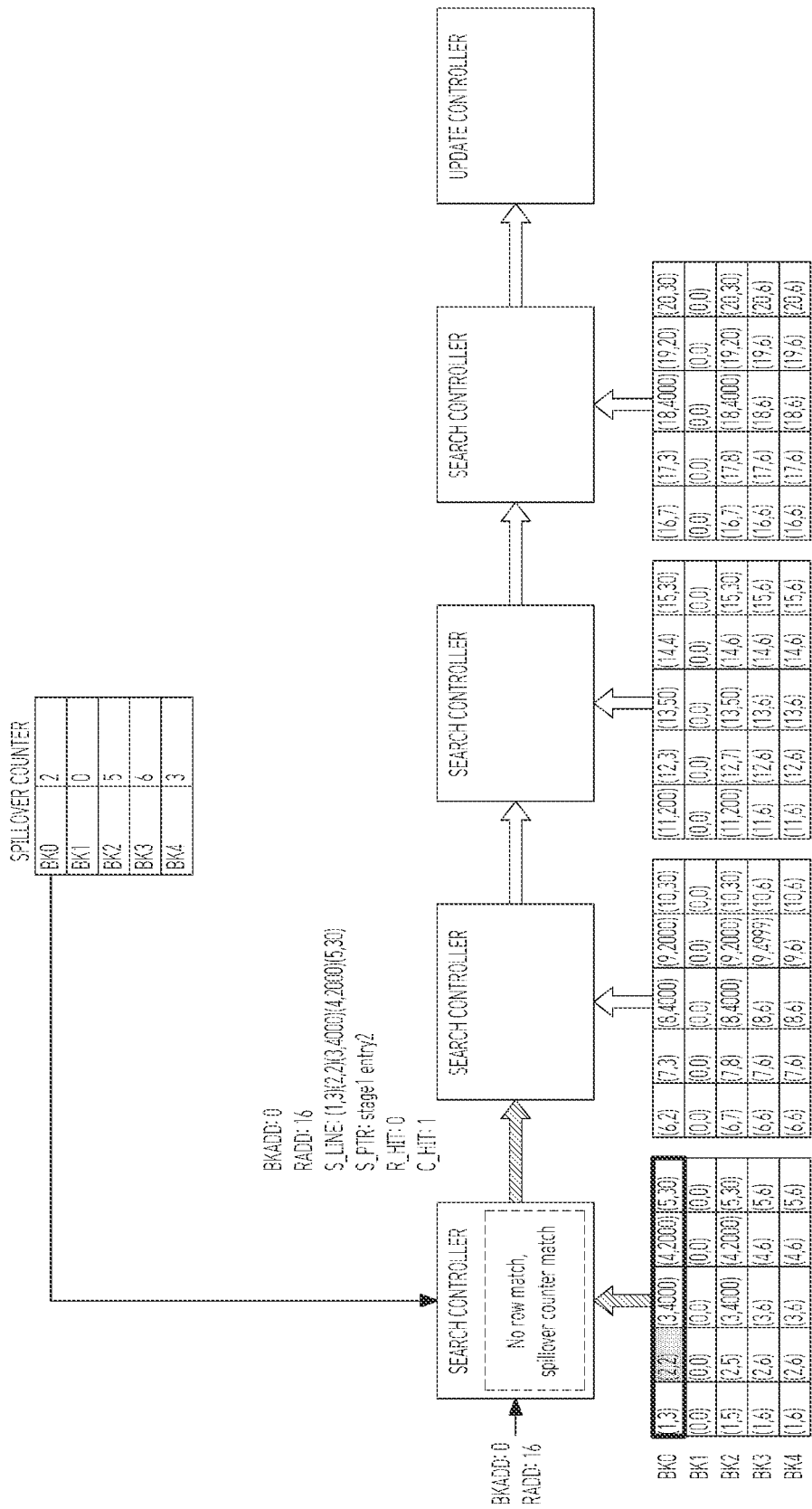

Referring to FIG. 15B, a bank address BKADD for designating the first bank BK0 and a row address RADD for designating a sixteenth row, that is, (BKADD: 0, RADD: 16), are input together with an active command ACT for a first clock cycle 1CK. The first search controller may read field data (i.e., candidate addresses and access counting values) (1,3), (2,2), (3,4000), (4,2000), (5,30) from the first field corresponding to the first bank BK0 among the fields of the first storage device, and read the miss-counting value 2 from the spillover counter. Since all candidate addresses are different from the row address RADD 16 and the access counting value 2 of the second entry is identical to the miss-counting value 2, the first search controller may activate the count hit signal C_HIT, generate field information S_LINE and S_PTR for the first field, and transmit signals to the second search controller. In this case, the shifting line data S_LINE of the field information S_LINE and S_PTR is updated with the field data (1,3), (2,2), (3,4000), (4,2000), (5,30) read from the first field, and the position pointer S_PTR may be set to a value (stage 1, entry 2) designating the stage of the first storage device and the hit second entry.

Figure 15C:
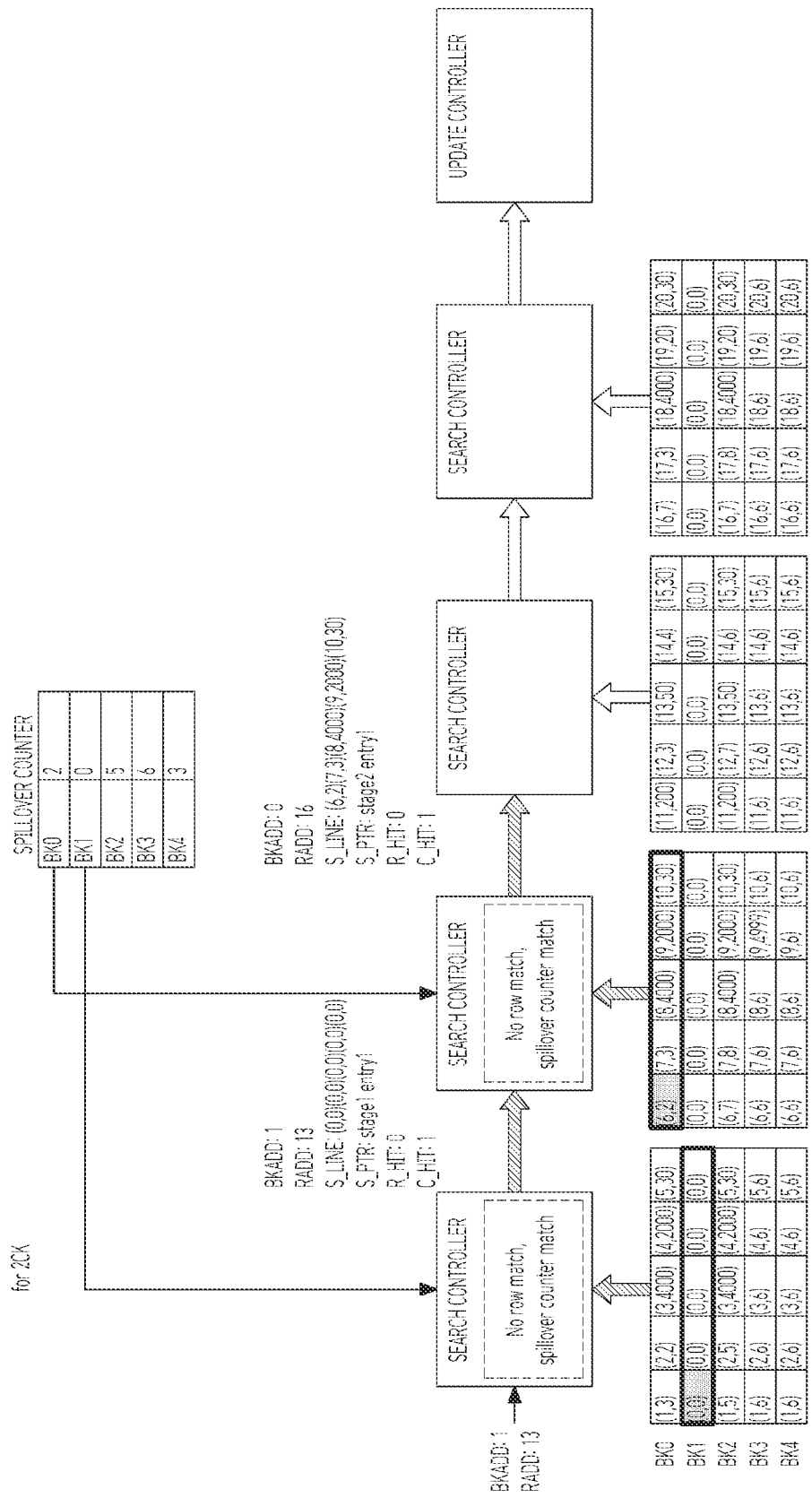

Referring to FIG. 15C, the bank address BKADD for designating the second bank BK1 and the row address RADD for designating a thirteenth row, that is, (BKADD: 1, RADD: 13), are input together with the active command ACT for a second clock cycle 2CK. The first search controller may read field data (0,0), (0,0), (0,0), (0,0), (0,0) from the second field corresponding to the second bank BK1, and read the miss-counting value 0 from the spillover counter. Since the access counting value 0 of the first entry is identical to the miss-counting value 0, the first search controller may generate field information S_LINE and S_PTR for the second field and transmit signals to the second search controller. In this case, the shifting line data S_LINE is updated with the field data (0,0), (0,0), (0,0), (0,0), (0,0) read from the second field, and the position pointer S_PTR may be set to a value (stage 1, entry 1) designating the stage of the first storage device and the hit first entry.

In addition, the second search controller may read field data (6,2), (7,3), (8,4000), (9,2000), (10,30) from the first field corresponding to the first bank BK0 according to the bank address BKADD received from the first search controller, and read the miss-counting value 2 from the spillover counter. Since the access counting value 2 of the first entry is identical to the miss-counting value 2, the second search controller may update the shifting line data S_LINE to the field data (6,2), (7,3) (8,4000), (9,2000), (10,30) read from the first field, and set the position pointer S_PTR to a value (stage 2, entry 1).

Figure 15D:
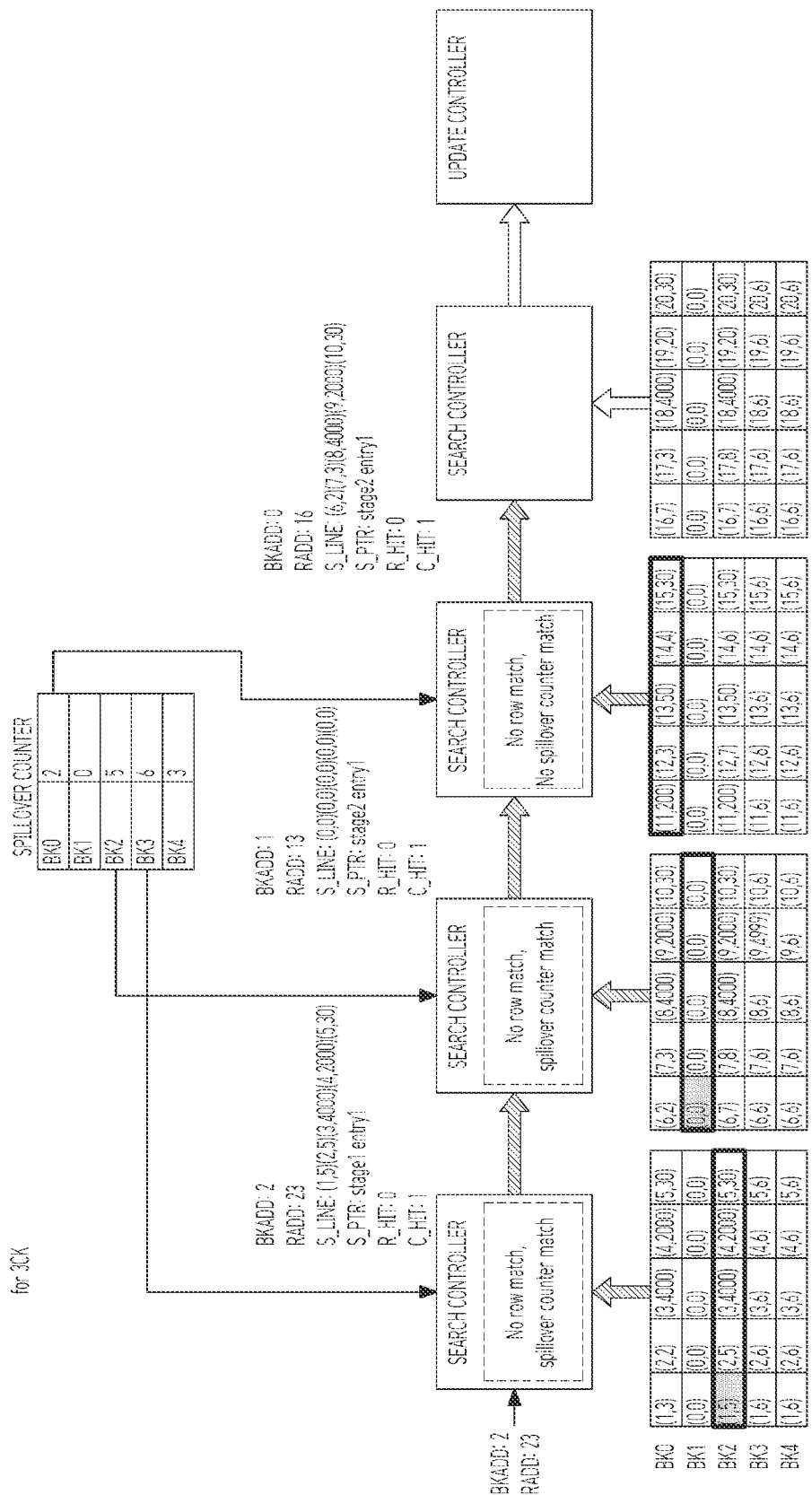

Referring to FIG. 15D, the bank address BKADD for designating the third bank BK2 and the row address RADD for designating a 23-th row, that is, (BKADD: 2, RADD: 23), are input together with the active command ACT for a third clock cycle 3CK. Since the access counting value 5 of the first entry of the third field first is identical to the miss-counting value 5, the first search controller may update the shifting line data S_LINE to field data (1,5), (2,5), (3,4000), (4,2000), (5,30) read from the third field and set the position pointer S_PTR to a value (stage 1, entry 1). The second search controller may update the shifting line data S_LINE to field data (0,0), (0,0), (0,0), (0,0), (0,0) read from the second field and set the position pointer S_PTR to a value (stage 2, entry 1) since the access counting value 0 of the first entry of the second field is identical to the miss-counting value 0. In addition, since the comparison results are all inconsistent, the third search controller may transfer signals received from the second search controller to the fourth search controller as they are.

Figure 15E:
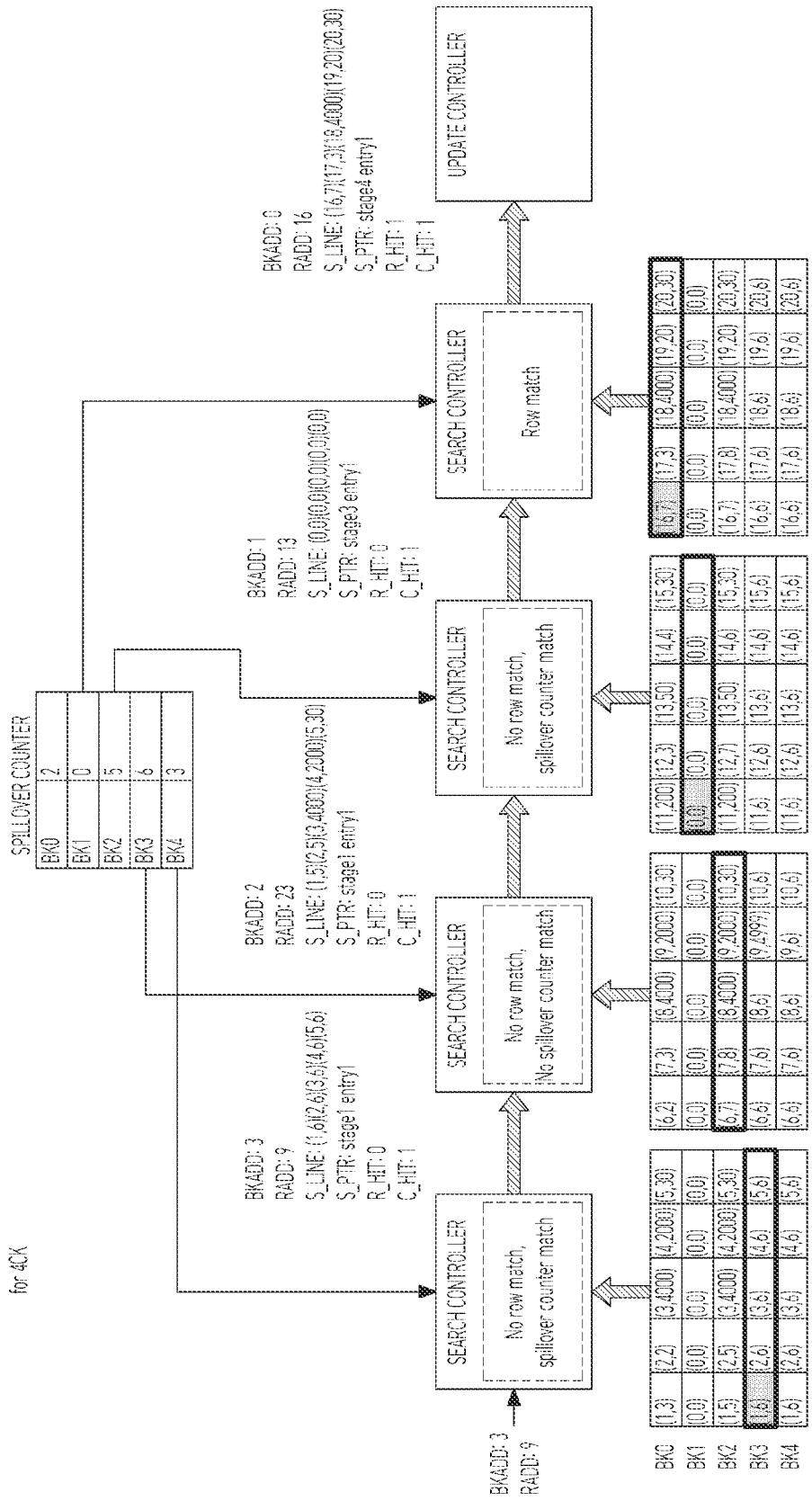

Referring to FIG. 15E, the bank address BKADD for designating the fourth bank BK3 and the row address RADD for designating a ninth row, that is, (BKADD: 3, RADD: 9), are input together with the active command ACT for a fourth clock cycle 4CK. Since the access counting value 6 of the first entry of the fourth field is identical to the miss-counting value 6, the first search controller may update the shifting line data S_LINE to field data (1,6), (2,6), (3,6), (4,6), (5,6) read from the fourth field and set the position pointer S_PTR to a value (stage 1, entry 1). Since all of the comparison results are inconsistent, the second search controller may transfer signals received from the first search controller to the third search controller as they are. Since the access counting value 0 of the first entry of the second field is identical to the miss-counting value 0, the third search controller may update the shifting line data S_LINE to field data (0,0), (0,0), (0,0), (0,0), (0,0) read from the second field and set the position pointer S_PTR to a value (stage 3, entry 1). Since the candidate address 16 of the first entry of the first field is identical to the row address RADD 16, the fourth search controller may activate the address hit signal R_HIT, update the shifting line data S_LINE to field data (16,7), (17,3), (18,4000), (19,20), (20,30) read from the first field, and set the position pointer S_PTR to a value (stage 4, entry 1).

Figure 15F:
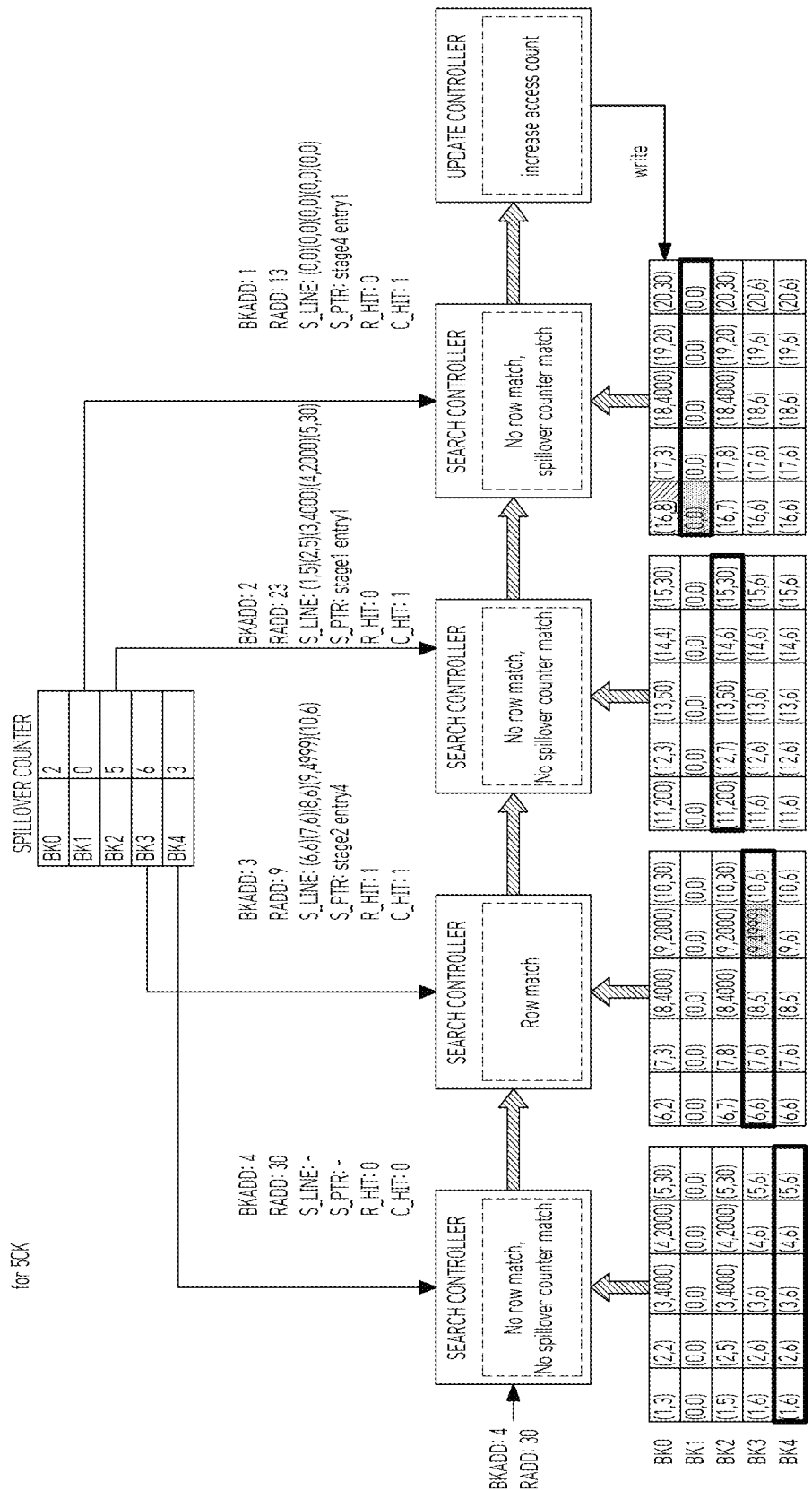

Thereafter, for a fifth clock cycle 5CK, the update controller may check the signals transmitted from the fourth search controller. Since the address hit signal R_HIT is activated and the access counting value 7 of the first entry of the shifting line data S_LINE designated by the position pointer S_PTR is less than the row-hammer threshold RH_T, the update controller may increase the access counting value 7 of the first entry of the shifting line data S_LINE by a particular value, e.g., "+1". Referring to FIG. 15F, the update controller may write the shifting line data S_LINE to the first field of the fourth storage device designated by the position pointer S_PTR. Accordingly, the first entry of the first field may be updated to a value (16,8). Since the update controller knows the bank address BKADD, the update controller may select the first field.

During the fifth clock cycle 5CK, the bank address BKADD for designating the fifth bank BK4 and the row address RADD designating a 30-th row, that is, (BKADD: 4, RADD: 30), are input together with the active command ACT. The first search controller may transfer signals set to initial values to the second search controller as they are. Since the candidate address 9 of the fourth entry of the fourth field is identical to the row address RADD 9, the second search controller may activate the address hit signal R_HIT, update the shifting line data S_LINE to field data (6,6), (7,6), (8,6), (9,4999), (10,6) read from the fourth field, and set the position pointer S_PTR to a value (stage 2, entry 4). The third search controller may transfer signals received from the second search controller to the fourth search controller as they are. The fourth search controller may update the shifting line data S_LINE to field data (0,0), (0,0), (0,0), (0,0), (0,0) read from the second field and set the position pointer S_PTR to a value (stage 4, entry 1) since the access counting value 0 of the first entry of the second field is identical to the miss-counting value 0.

Figure 15G:
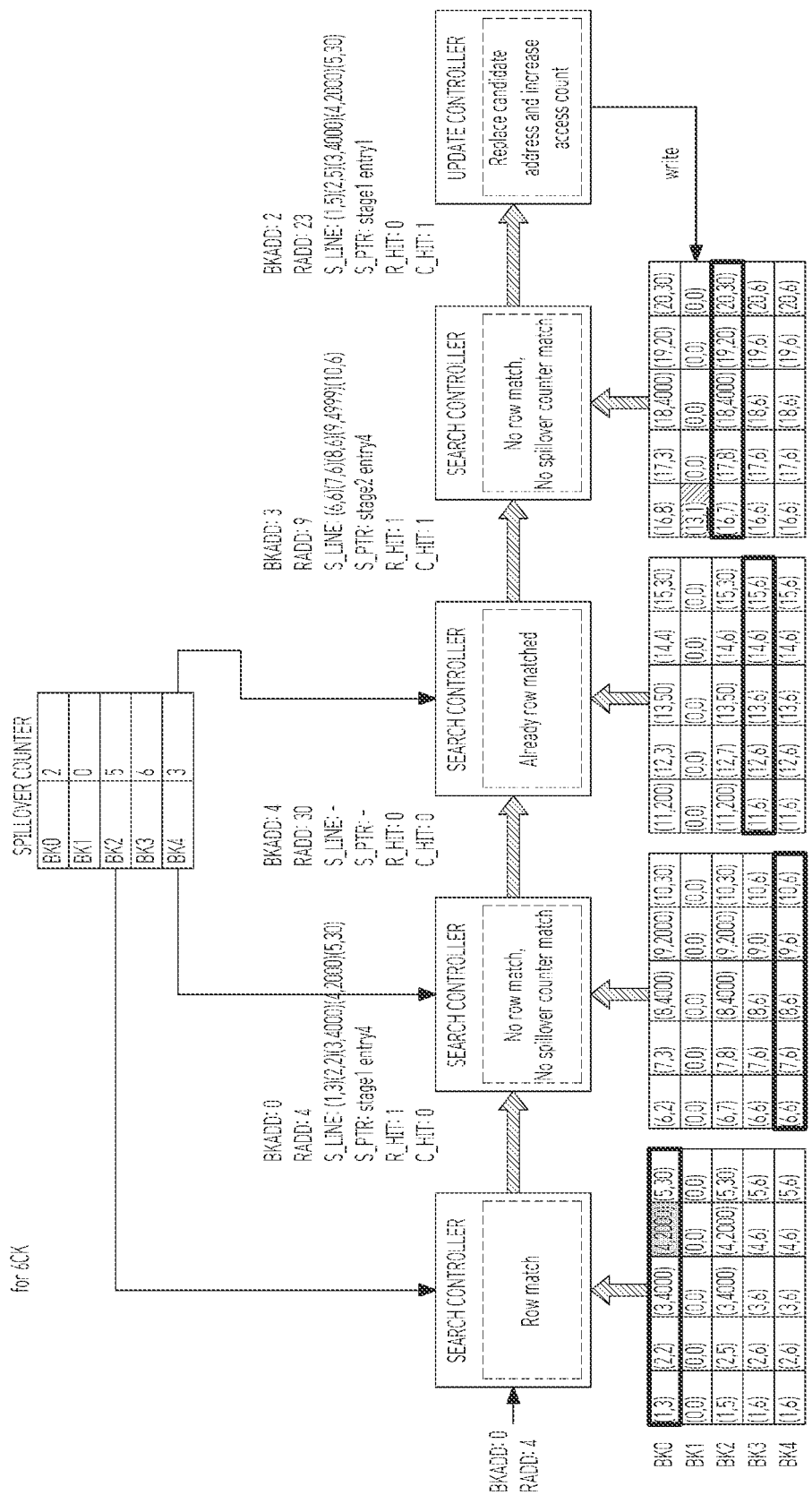

Thereafter, for a sixth clock cycle 6CK, the update controller may check the signals transmitted from the fourth search controller. Since the count hit signal C_HIT is activated, the update controller may replace the candidate address of the first entry of the shifting line data S_LINE with the row address RADD 13, and increase the access counting value 0 of the first entry of the shifting line data S_LINE by a particular value, e.g., "+1". Referring to FIG. 15G, the update controller may write the shifting line data S_LINE to the second field of the fourth storage device designated by the position pointer S_PTR. Accordingly, the first entry of the second field may be updated to a value (13,1). During the sixth clock cycle 6CK, the bank address BKADD for designating the first bank BK0 and the row address RADD for designating a fourth row, that is, (BKADD: 0, RADD: 4), are input together with the active command ACT. As described above, each search controller may generate the address hit signal R_HIT, the count hit signal C_HIT, and the field information S_LINE and S_PTR.

Figure 15H:
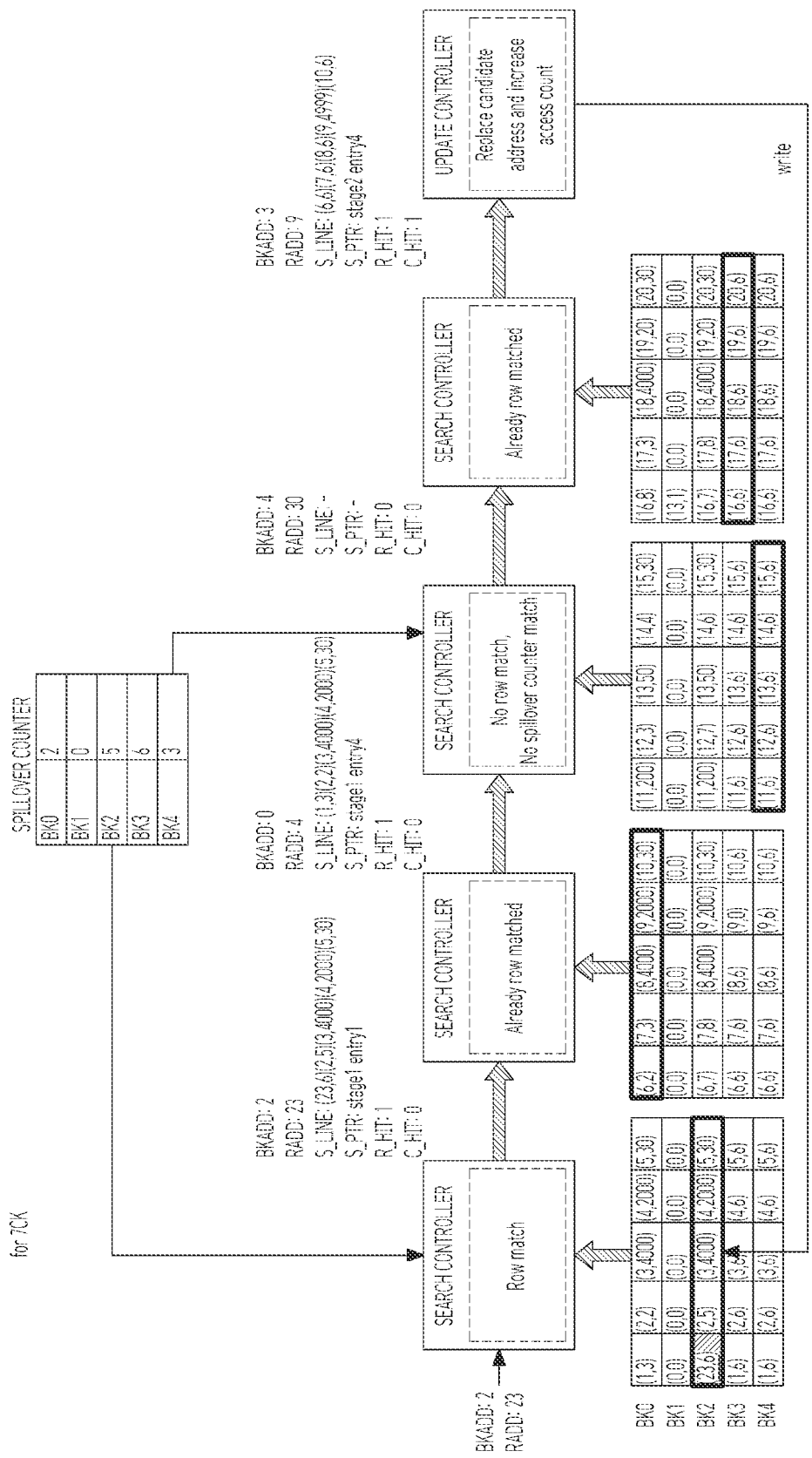

Thereafter, for a seventh clock cycle 7CK, the update controller may replace the candidate address of the first entry of the shifting line data S_LINE with the row address RADD 23 according to the count hit signal C_HIT, and increase the access counting value 5 of the first entry of the shifting line data S_LINE by a particular value, e.g., "+1". Referring to FIG. 15H, the update controller may write the shifting line data S_LINE to the third field of the first storage device designated by the position pointer S_PTR. Accordingly, the first entry of the third field may be updated to a value (23,6). During the seventh clock cycle 7CK, the bank address BKADD for designating the third bank BK2 and the row address RADD for designating a 23-th row, that is, (BKADD: 2, RADD: 23), are input together with the active command ACT. As described above, each search controller may generate the address hit signal R_HIT, the count hit signal C_HIT, and the field information S_LINE and S_PTR.

Figure 15I:
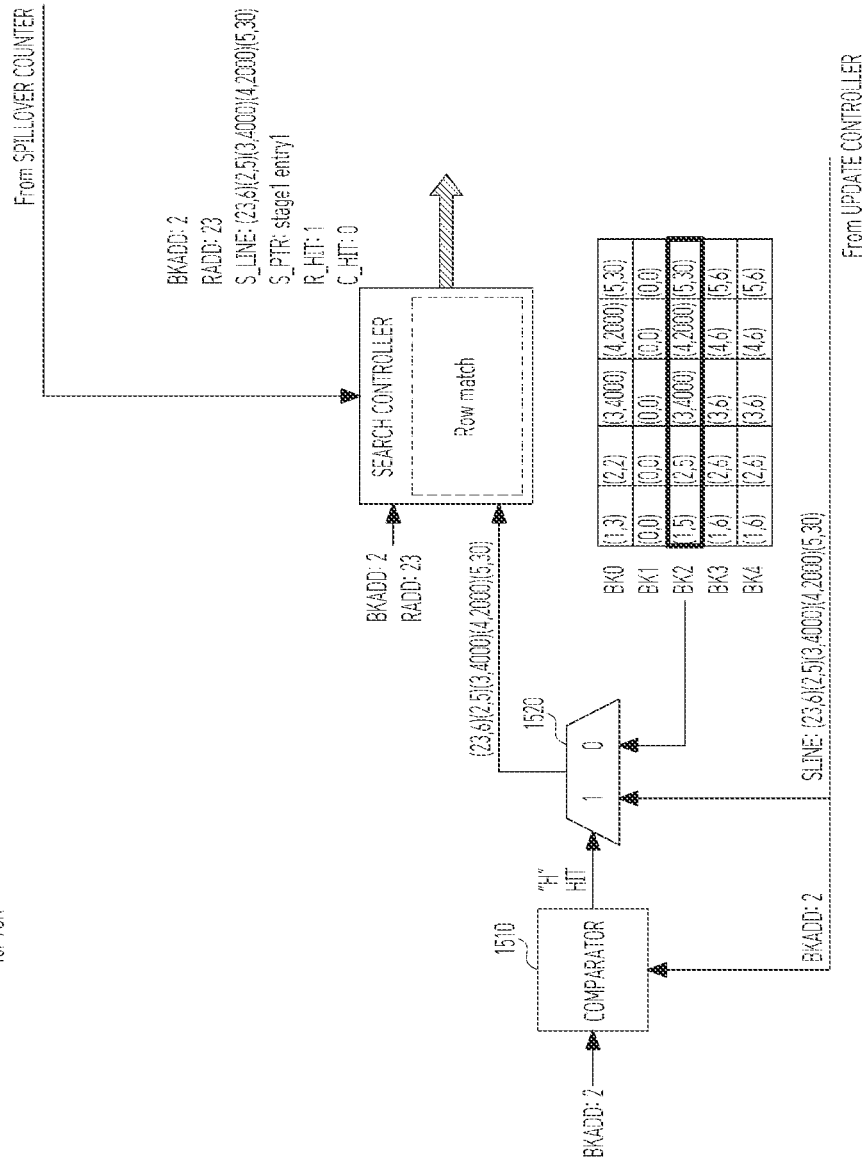

According to an embodiment, additional circuits for preventing collisions may be arranged when a write operation of the update controller and a read operation of the search controller for the same field are simultaneously requested. For example, referring to FIG. 15I, a comparator 1510 and a multiplexer 1520 may be disposed at a front end of each search controller. The comparator 1510 may generate a match signal HIT by comparing the bank address BKADD input to the search controller with the bank address BKADD provided from the update controller for each clock. The multiplexer 1520 may select one of field data read from the field of the storage device corresponding to the bank address BKADD and the shifting line data S_LINE provided from the update controller and provide the selected one to the search controller according to the match signal HIT. For example, referring to FIG. 15I, during the seventh clock cycle 7CK, the comparator 1510 may generate the match signal HIT to a logic high level "H" when the bank address BKADD input to the search controller is identical to the bank address BKADD provided from the update controller, as the bank address to the third bank BK2. The multiplexer 1520 may select the shifting line data S_LINE provided from the update controller in response to the match signal HIT of a logic high level and provide the shifting line data S_LINE to the search controller. Finally, the search controller may generate the address hit signal R_HIT, the count hit signal C_HIT, and the field information S_LINE and S_PTR using the bank address BKADD, the row address RADD, the selected data provided from the multiplexer 1520, and the miss-counting value provided from the spillover counter. The update controller may perform the write operation. In FIG. 15I, the comparator 1510 and the multiplexer 1520 are disposed at the front end of the search controller, but the embodiment is not limited thereto. Depending on an embodiment, the comparator 1510 and the multiplexer 1520 may be included in each search controller.

Figure 15J:
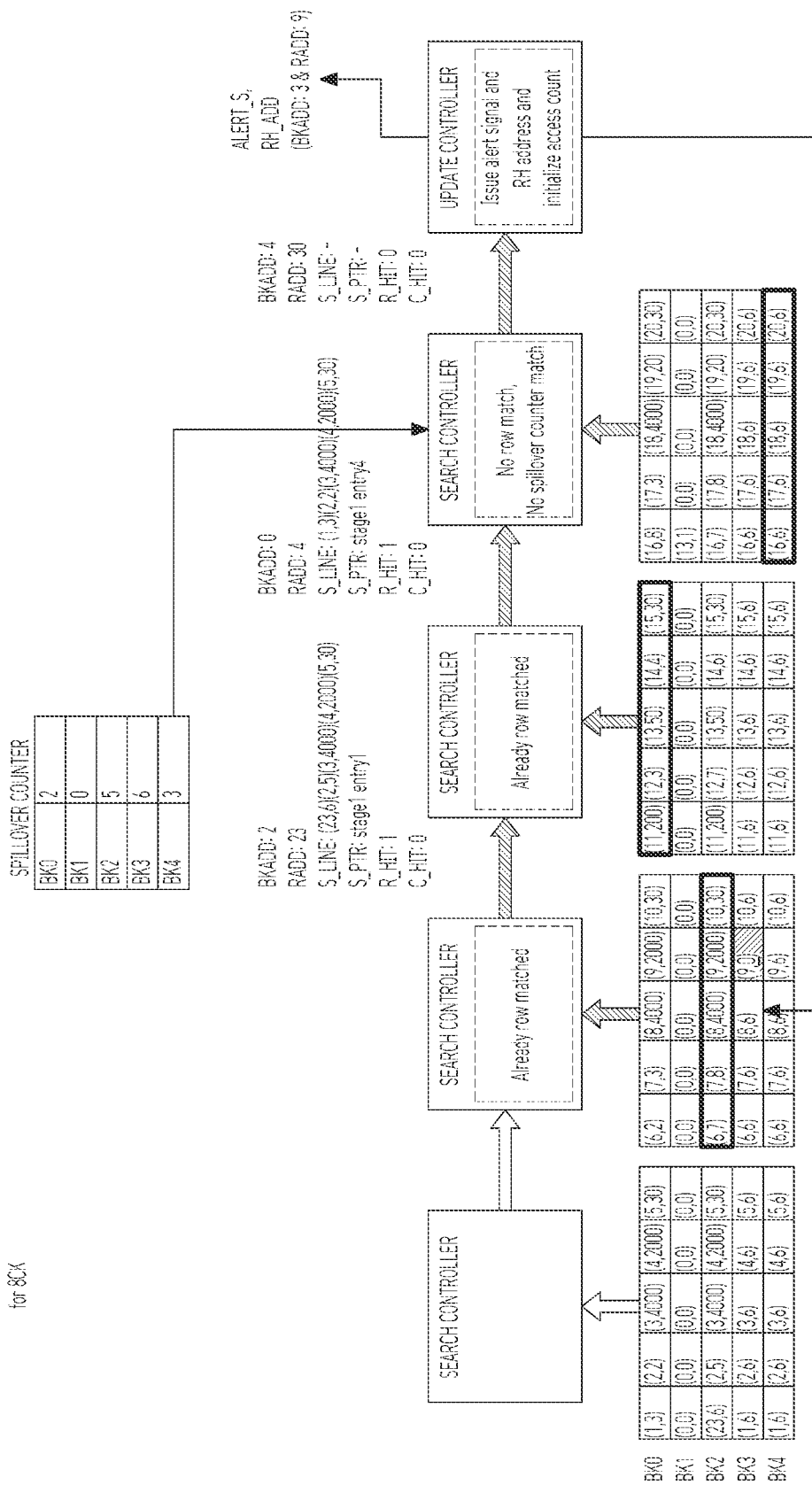

For an eighth clock cycle 8CK, the update controller may confirm that the address hit signal R_HIT is activated and the access counting value of the fourth entry of the shifting line data S_LINE designated by the position pointer S_PTR is greater than or equal to the row-hammer threshold RH_T. Therefore, the update controller may generate a row-hammer address RH_ADD including the candidate address (or the row address RADD) and the bank address BKADD of the fourth entry of the shifting line data S_LINE, and set the access counting value of the fourth entry of the shifting line data S_LINE to 0. Referring to FIG. 15J, the update controller may output the row-hammer address RH_ADD together with an alert signal ALERT_S. In addition, the update controller may write the shifting line data S_LINE to the fourth field of the second storage device designated by the position pointer S_PTR. Accordingly, the fourth entry of the fourth field is updated to a value (9,0) so that the access counting value may be initialized.

Figure 15K:
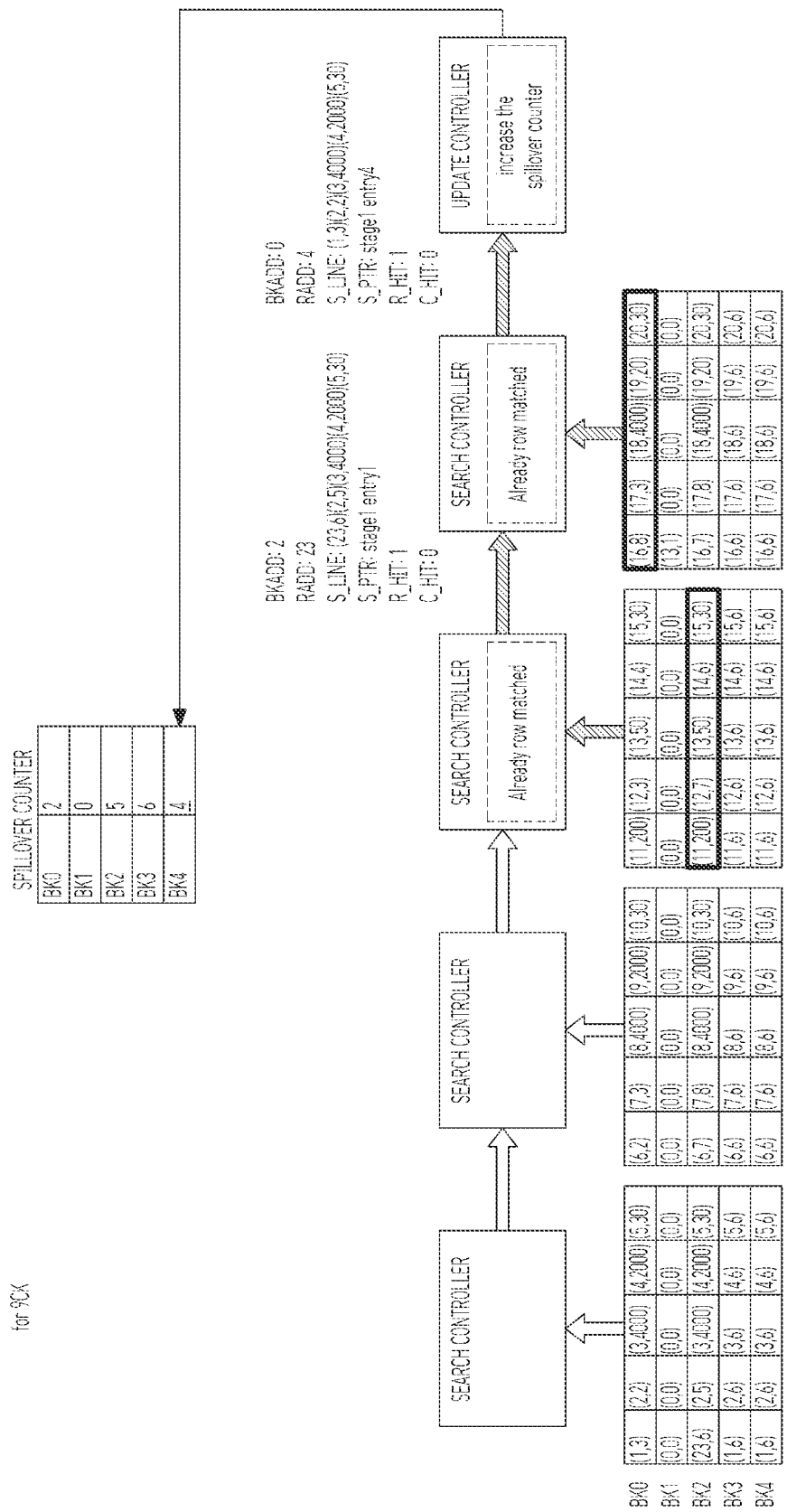

Referring to FIG. 15K, for a ninth clock cycle 9CK, since both the address hit signal R_HIT and the count hit signal C_HIT have been deactivated, the update controller may increase the miss-counting value 3 of the fifth field of the spillover counter by "+1" according to the bank address BKADD.

Figure 15L:
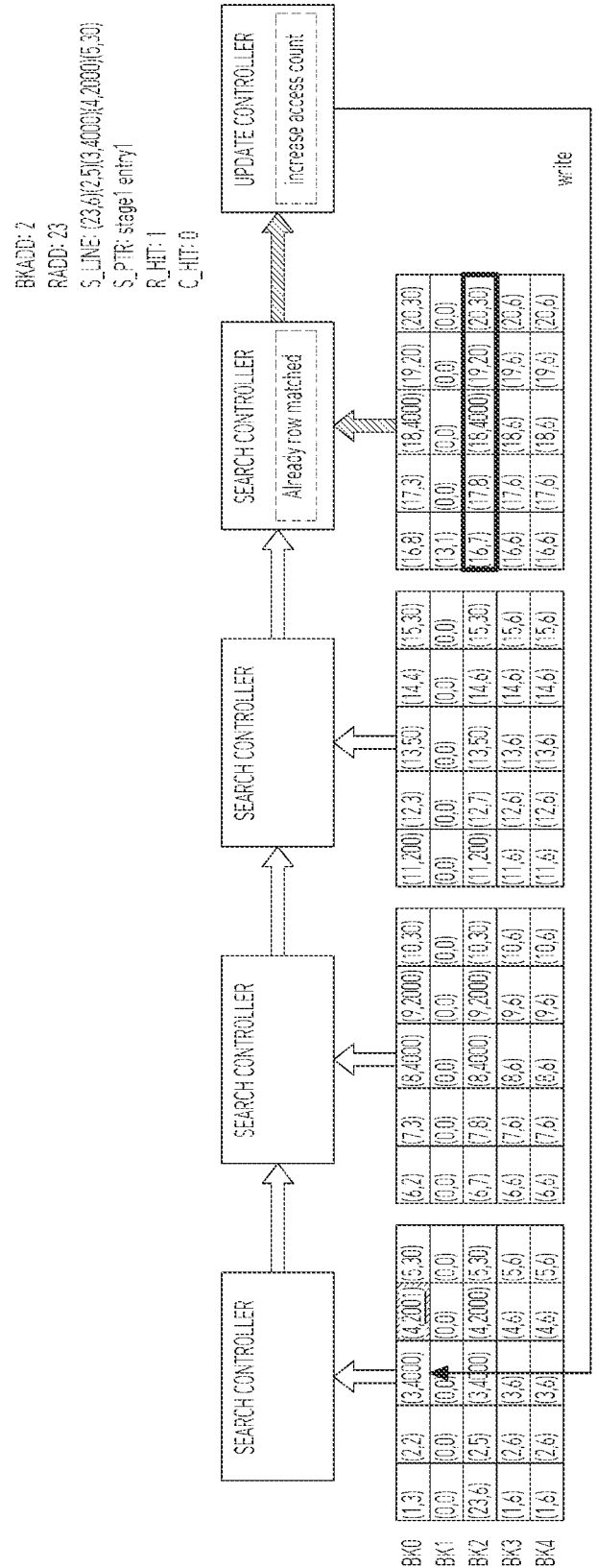

For a tenth clock cycle 10CK, since the address hit signal R_HIT is activated and the access counting value 2000 of the fourth entry of the shifting line data S_LINE designated by the position pointer S_PTR is less than the row-hammer threshold RH_T, the update controller may increase the access counting value 2000 of the fourth entry of the shifting line data S_LINE by "+1". Referring to FIG. 15L, the update controller may write the shifting line data S_LINE to the first field of the first storage device designated by the position pointer S_PTR. Accordingly, the fourth entry of the first field may be updated to a value (4,2001).

Figure 15M:
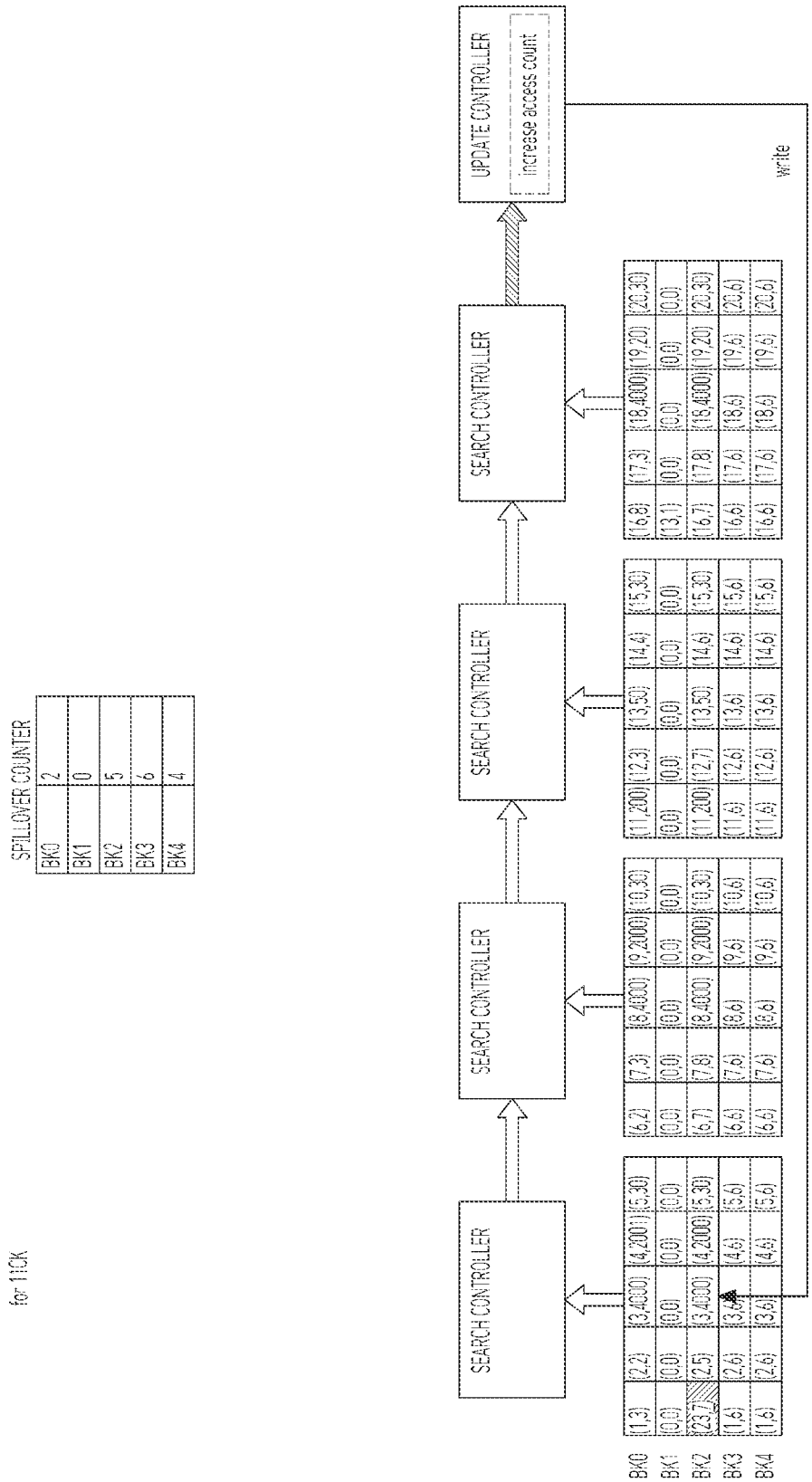

For an eleventh clock cycle 11CK, since the address hit signal R_HIT is activated, and the access counting value 6 of the first entry of the shifting line data S_LINE designated by the position pointer S_PTR is less than the row-hammer threshold RH_T, the update controller may increase the access counting value 6 of the first entry of the shifting line data S_LINE by "+1". Referring to FIG. 15M, the update controller may write the shifting line data S_LINE to the third field of the first storage device designated by the position pointer S_PTR. Accordingly, the first entry of the third field may be updated to a value (23,7).

For reference, a content addressable memory (CAM) is a memory with a relatively complex structure that can search for memory according to contents of data. When a data pattern is input, the CAM may search for data that matches the data pattern. For this reason, the CAM is used very efficiently in a database search, but due to its complex structure, it occupies a large capacity and is difficult to implement as the number of targets to be searched increases. A static random access memory (SRAM) is a memory with a relatively simple structure and can directly access or write data depending on an address. For this reason, the SRAM is characterized by high speed and low access latency, which can improve the work speed of the processor.

As described above, the memory controller 100 according to the embodiments of the present disclosure may store candidate addresses and their access counting values using SRAM as a storage device instead of a previously known CAM. When implementing a row-hammer tracking device using the CAM, the number of CAMs corresponding to the bank must be provided, and the lower the row-hammer threshold, the more targets to be searched, making it difficult to implement in practice. In the embodiments of the present disclosure, the area occupied by the row-hammer tracking device can be minimized by storing candidate addresses and their access counting values using the SRAM as a storage device. In addition, multiple SRAMs and their corresponding search controllers are arranged one-on-one, and search controllers read data stored in the SRAM in a pipeline manner to detect row-hammer addresses in a short time, thereby efficiently reducing the row-hammer risk.

In the above embodiments, the row-hammer tracking module 150 has been described to be placed inside the memory controller 100, but the embodiments are not limited thereto. According to an embodiment, the row-hammer tracking module 150 may be disposed in a module controller or a register clock driver of the memory module 200, and may be disposed in each memory device 200A.

Various embodiments of the present disclosure have been described in the drawings and specification. Although specific terminologies are used here, the terminologies are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

It should be noted that although the technical spirit of the disclosure has been described in connection with embodiments thereof, this is merely for description purposes and should not be interpreted as limiting. It should be appreciated by one of ordinary skill in the art that various changes may be made thereto without departing from the technical spirit of the disclosure and the following claims.

For example, for the logic gates and transistors provided as examples in the above-described embodiments, different positions and types may be implemented depending on the polarity of the input signal.

What is claimed is:

1. A memory controller comprising:
   a command/address generation module; and
   a row-hammer tracking module configured to track a row-hammer address based on an active command and an address for a target bank and a target row indicated by the active command, the active command and the address being received from the command/address generation module,
   wherein the row-hammer tracking module includes:
   a plurality of storage devices each including fields corresponding to banks, each of the fields storing candidate addresses and access counting values for the candidate addresses; and
   at least one search controller configured to sequentially search, according to a clock, fields of the plurality of storage devices corresponding to the target bank when the active command is input, and search, during one clock, fields of the plurality of storage devices corresponding to different banks based on active commands indicating the different banks.

2. The memory controller of claim 1, wherein fields at a same level, among the fields of the plurality of storage devices, store candidate addresses and access counting values for a same bank.

3. The memory controller of claim 1, wherein a number of the plurality of storage devices is set according to a first active interval that is a minimum interval between consecutive active commands for a same bank.

4. The memory controller of claim 3, wherein each of the plurality of storage devices has a depth set according to a number of banks.

5. The memory controller of claim 3, wherein the row-hammer tracking module is configured to:
   read candidate addresses and access counting values stored in a k-th field of an x-th storage device while reading candidate addresses and access counting values stored in an m-th field of an (x+y)-th storage device, for one clock,
   where k is a positive integer, x is a positive integer, m is a positive integer different from x, and y is set based on a second active interval that is a minimum interval between consecutive active commands for different banks.

6. The memory controller of claim 1, wherein a number of the plurality of storage devices is set according to a ratio of a first active interval and a second active interval, wherein the first active interval is a minimum interval between consecutive active commands for a same bank, and the second active interval is a minimum interval between consecutive active commands for different banks.

7. The memory controller of claim 6, wherein each of the plurality of storage devices has a depth set according to a product of the number of banks and the second active interval.

8. The memory controller of claim 6, wherein the row-hammer tracking module is configured to:
   read candidate addresses and access counting values stored in a k-th field of an x-th storage device while reading candidate addresses and access counting values stored in a (k−y)-th field of a z-th storage device,
   where k is a positive integer, x is a positive integer, z is a positive integer different from x, and y is set based on the second active interval and an order of banks in which the active command is input.

9. A row-hammer tracking device comprising:
   a spillover counter configured to store a miss-counting value;

a plurality of storage devices each including fields corresponding to banks, each of the fields storing candidate addresses and access counting values for the candidate addresses;

a plurality of search controllers cascaded to each other and corresponding to the plurality of storage devices, configured to generate an address hit signal, a count hit signal, and field information by comparing candidate addresses and access counting values read from fields corresponding to a bank address, with a row address and the miss-counting value, respectively; and an update controller configured to update the miss-counting value or an access counting value of a target field designated by the field information, according to the address hit signal and the count hit signal.

10. The row-hammer tracking device of claim 9, wherein each of the plurality of storage devices includes a static random access memory (SRAM).

11. The row-hammer tracking device of claim 9, wherein k-th fields of the plurality of storage devices store candidate addresses and access counting values for a same bank, where k is a positive integer.

12. The row-hammer tracking device of claim 9, wherein the plurality of search controllers sequentially read candidate addresses and access counting values stored in fields at a same level, among the fields of the plurality of storage devices, based on a clock.

13. The row-hammer tracking device of claim 12, wherein the plurality of search controllers simultaneously read candidate addresses and access counting values stored in fields at different levels, among the fields of the plurality of storage devices.

14. The row-hammer tracking device of claim 9, wherein a number of the plurality of storage devices is set according to a first active interval that is a minimum interval between consecutive active commands for a same bank.

15. The row-hammer tracking device of claim 14, wherein each of the plurality of storage devices has a depth set according to a number of banks.

16. The row-hammer tracking device of claim 9, wherein a number of the plurality of storage devices is set according to a ratio of a first active interval and a second active interval, wherein the first active interval is a minimum interval between consecutive active commands for a same bank, and the second active interval is a minimum interval between consecutive active commands for different banks.

17. The row-hammer tracking device of claim 16, wherein each of the plurality of storage devices has a depth set according to a product of the number of banks and the second active interval.

18. The row-hammer tracking device of claim 9, wherein the update controller is configured to:

when the address hit signal is activated, increase the access counting value of the target field when the access counting value of the target field is less than a row-hammer threshold, and generate a row-hammer address using a candidate address of the target field and initialize the access counting value of the target field.

19. The row-hammer tracking device of claim 9, wherein the update controller is configured to:

replace a candidate address of the target field with the row address and increase the access counting value of the target field when the count hit signal is activated, and increase the miss-counting value of the spillover counter when the count hit signal is deactivated.

20. The row-hammer tracking device of claim 9, wherein the spillover counter stores a plurality of miss-counting values corresponding to the banks, respectively, and wherein the update controller reads a miss-counting value corresponding to the bank address, from the spillover counter.

21. The row-hammer tracking device of claim 9, further comprising:

a reset circuit configured to generate a reset signal at refresh time intervals, wherein the update controller initializes all fields of the storage devices and the miss-counting value of the spillover counter, in response to the reset signal.

* * * * *